US011586960B2

(12) United States Patent
Harris et al.

(10) Patent No.: US 11,586,960 B2
(45) Date of Patent: Feb. 21, 2023

(54) AUTONOMOUS LEARNING PLATFORM FOR NOVEL FEATURE DISCOVERY

(71) Applicant: VISA INTERNATIONAL SERVICE ASSOCIATION, San Francisco, CA (US)

(72) Inventors: Theodore D. Harris, San Francisco, CA (US); Craig O'Connell, San Mateo, CA (US); Yue Li, San Mateo, CA (US); Tatiana Korolevskaya, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1477 days.

(21) Appl. No.: 15/590,988

(22) Filed: May 9, 2017

(65) Prior Publication Data

US 2018/0330258 A1   Nov. 15, 2018

(51) Int. Cl.
  *G06N 7/00*  (2006.01)
  *G06N 5/02*  (2006.01)
  (Continued)

(52) U.S. Cl.
  CPC .............. *G06N 7/005* (2013.01); *G06N 3/006* (2013.01); *G06N 5/003* (2013.01); *G06N 5/022* (2013.01);
  (Continued)

(58) Field of Classification Search
  None
  See application file for complete search history.

(56) References Cited

U.S. PATENT DOCUMENTS 8,126,825 B2   2/2012 Guyon
2005/0154701 A1   7/2005 Parunak et al.
(Continued)

FOREIGN PATENT DOCUMENTS

CN   106599936 A   *   4/2017   .......... G06K 9/6227

OTHER PUBLICATIONS

Aghdam, M.H. et al., "Text feature selection using ant colony optimization," Expert Systems with Applications, vol. 36 (2009) pp. 6843-6853. (Year: 2009).*

(Continued)

*Primary Examiner* — Brian M Smith
(74) *Attorney, Agent, or Firm* — Kilpatrick Townsend & Stockton LLP

(57) ABSTRACT

Embodiments are directed to a method of performing autonomous learning for updating input features used for an artificial intelligence model, the method comprising receiving updated data of an information space that includes a graph of nodes having a defined topology, the updated data including historical data of requests to the artificial intelligence model and output results associated with the requests, wherein different categories of input data corresponds to different input nodes of the graph. The method may further comprise updating edge connections between the nodes of the graph by performing path optimizations that each use a set of agents to explore the information space over cycles to reduce a cost function, each connection including a strength value, wherein during each path optimization, path information is shared between the rest of agents at each cycle for determining a next position value for each of the set of agents in the graph.

20 Claims, 11 Drawing Sheets

(51) Int. Cl.
  *G06N 5/00*   (2006.01)
  *G06N 5/022*  (2023.01)
  *G06N 3/006*  (2023.01)
  *G06N 5/043*  (2023.01)
  *G06N 20/00*  (2019.01)

(52) U.S. Cl.
  CPC ............ *G06N 5/043* (2013.01); *G06N 20/00* (2019.01); *G06N 5/027* (2013.01)

(56) References Cited

U.S. PATENT DOCUMENTS

| | | |
|---|---|---|
| 2006/0143071 A1 | 6/2006 | Hofmann |
| 2009/0106223 A1 | 4/2009 | Meyerzon et al. |
| 2010/0223216 A1 | 9/2010 | Eggert et al. |
| 2012/0191631 A1* | 7/2012 | Breckenridge ........ G06N 20/00 706/12 |
| 2015/0193694 A1 | 7/2015 | Vasseur et al. |

OTHER PUBLICATIONS

Wagner, A., "Specifications of Building Polish Lexica for Application in ASR and TTS systems," Speech and Computer Conference (Jun. 2009) 7 pp. (Year: 2009).*

Dawson, L. et al., "Improving Ant Colony Optimization performance on the GPU using CUDA," 2013 IEEE Conf. on Evolutionary Computation (Jun. 2013) pp. 1901-1908. (Year: 2013).*

Moh'd Mesleh, A. et al., "Support Vector Machine Text Classification System: Using Ant Colony Optimization Based Feature Subset Selection," 2008 Intl. Conf. on Computer Engineering and Systems (2008) pp. 143-148. (Year: 2008).*

Shen, P. et al., "An improved parallel Bayesian text classification algorithm," Review of Computer Engineering Studies, vol. 3, No. 1 (Mar. 2016) pp. 6-10. (Year: 2016).*

Rodrigues, D. et al., "A wrapper approach for feature selection based on Bat Algorithm and Optimum-Path Forest," Expert Systems with Applications, vol. 41 (2014) pp. 2250-2258. (Year: 2014).*

PCT/US2018/030945, "International Search Report and Written Opinion", dated Aug. 27, 2018, 15 pages.

Blum, "Ant Colony Optimization: Introduction and Recent Trends", Physics of Life Reviews 2, Elsevier B.V., (2005), p. 353-373.

\* cited by examiner

700

| Graph | Command | Explanation |
|---|---|---|
| 710  | g.V.has('userId', 'U1064') | Start with the graph, and select the vertex with the property 'userId' with a value of 'U1064'. |
| 720  | out('friend') | Move 'out' along any 'friend' edges to adjacent vertices. |
| 730  | out('visit') | Move 'out' along any 'visit' edges to adjacent vertices. |
| 740  | as('x') | Remember the current selection as 'x'. |

AUTONOMOUS LEARNING PLATFORM FOR NOVEL FEATURE DISCOVERY

BACKGROUND

In today's technological environment, artificial intelligence (e.g., machine learning) models may be used to predict or detect outcomes from known inputs. For example, a prediction can be used when an outcome has not occurred yet, or detection can occur when an object is classified (e.g., an image). The models may involve using a learning algorithm to better evaluate input data over time, by optimizing a model's output to a known pattern in training data in order to improve the model's accuracy.

In many cases, the artificial intelligence model may detect an outcome that is based on static information, such as identifying images or navigating through an unchanging environment. In such cases, the artificial intelligence model may iteratively become better at achieving its goal, and may begin quickly predicting or detecting outcomes based on known features. However, in some cases, it is desired for an artificial intelligence model to operate in a dynamically changing environment, in which predictive features may vary from week to week, month to month, etc.

For example, an artificial intelligence model may be developed for routing messages in a communication network. In such an instance, the learning algorithm may begin to determine the quickest route for each message that needs to be sent. However, the speed of each communication channel in the network may vary over time or some of the network nodes within a route may become corrupted or unusable. In another example, an artificial intelligence model may be developed for an automated motor vehicle designed to autonomously explore a new planet. The terrain and climate of the planet may vary dramatically, and may require the spacecraft to adapt and control its own systems in an optimal manner.

Therefore, it is desirable for a machine learning algorithm that detects new features in a dynamically changing environment.

BRIEF SUMMARY

Various embodiments are directed to performing autonomous learning for updating input features used for an artificial intelligence model. For example, a method can comprise receiving updated data of an information space that includes a graph of nodes having a defined topology, the updated data including historical data of requests to the artificial intelligence model and output results associated with the requests, wherein different categories of input data corresponds to different input nodes of the graph. The method may further comprise updating edge connections between the nodes of the graph by performing path optimizations that each use a set of agents to explore the information space over cycles to reduce a cost function, each connection including a strength value, wherein during each path optimization, path information is shared between the rest of agents at each cycle for determining a next position value for each of the set of agents in the graph. In addition, the method may also include grouping input nodes to identify candidate input features to the artificial intelligence model, wherein the input node(s) of a candidate input feature are correlated to each other, and wherein the candidate input features have strength values above a threshold. Furthermore, the method may comprise training an enlarged artificial intelligence model using the historical data for the candidate input features, the training providing a ranking of candidate input features relative to a measure of effect on an output value of the enlarged artificial intelligence model, and selecting the top N candidate input features to be used in the artificial intelligence model.

Another embodiment of the invention may be directed to the above method, wherein the graph is sharded into overlapping subgraphs that may be searched for a solution by the agents in parallel, and wherein the agents searching the subgraphs for solutions may be distributed amongst cores in a multi-core graphic processing unit.

Other embodiments are directed to systems, devices, and computer readable media associated with methods described herein.

A better understanding of the nature and advantages of embodiments of the present invention may be gained with reference to the following detailed description and the accompanying drawings.

TERMS

Figure 1:
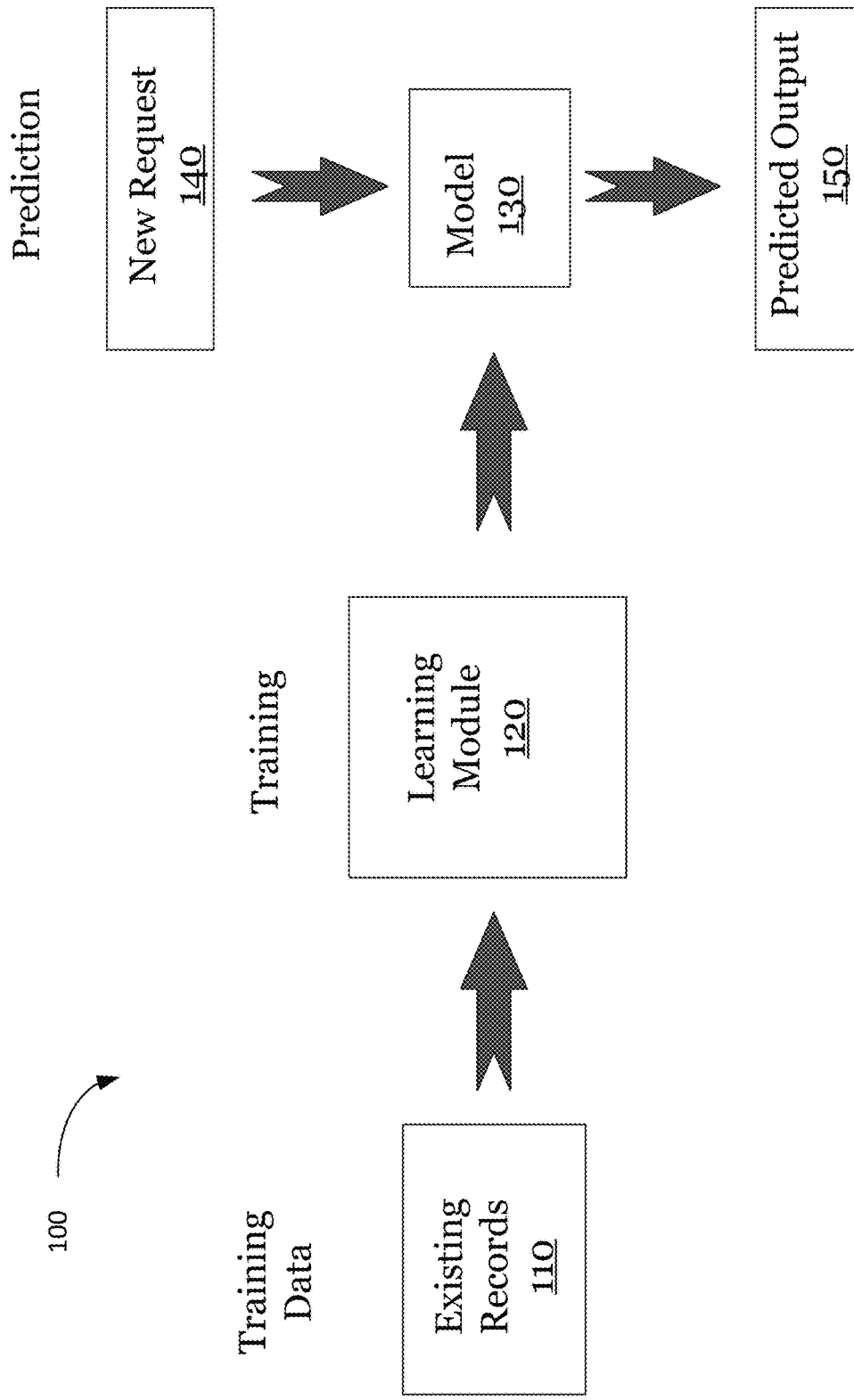
FIG. 1 shows a high-level diagram depicting a process for training and using a machine learning model.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

The term "artificial intelligence model" or "AI model" may refer to a model that may be used to predict outcomes in order achieve a target goal. The AI model may be developed using a learning algorithm, in which training data is classified based on known or inferred patterns. An AI model may also be referred to as a "machine learning model."

The term "information space" may refer to a set of data that may be explored to identify specific data to be used in training a machine learning model. The information space may comprise data relating to events, such as the time and place that the events occurred, the devices involved, and the specific actions performed. An involved device may be identified by an identification number and may further be associated with a user or entity. The user or entity may be associated with profile data regarding the user or entity's behavior and characteristics. The data may further be characterized as comprising input and output variables, which may be recorded and learned from in order to make predictions. For example, an information space may comprise a transactional network of consumer and merchants that may be defined by known characteristics, such as name, location, age, type, etc. The interactions between the consumers and merchants may further be described and defined by variables, such as transaction amount and transaction time, which may later be used to identify patterns in the information space and make predictions about what interactions will happen next.

The term "node" may refer to a discrete data point representing specified information. Nodes may be connected to one another in a topological graph by edges, which may be assigned a value known as an edge weight in order to describe the connection strength between the two nodes. For example, a first node may be a data point representing a first device in a network, and the first node may be connected in a graph to a second node representing a second device in the network. The connection strength may be defined by an edge weight corresponding to how quickly and easily information may be transmitted between the two nodes. An edge weight may also be used to express a cost or a distance required to move from one state or node to the next. For example, a first node may be a data point representing a first position of a machine, and the first node may be connected in a graph to a second node for a second position of the machine. The edge weight may be the energy required to move from the first position to the second position.

A "feature" may refer to a specific set of data to be used in training a machine learning model. An input feature may be data that is compiled and expressed in a form that may be accepted and used to train an artificial intelligence model as useful information for making predictions. An input feature may be identified as a collection of one or more input nodes in a graph, such as a path comprising the input nodes. For example, an input feature may be identified as a path (set) comprising input nodes for 'male,' '25 years old,' lives in San Francisco,' and 'college graduate.' In another example, an input feature may be identified as a path comprising input nodes for 'object detected' 'distance=1 m,' 'shape=round,' 'diameter=5 cm,' 'color=orange.' Features may be organized into a searchable format, such as a graph database or index table. For example, input features may be organized as a list of keys that may be indexed, queried, and assigned values for making predictions. A list of input features gathered for use by an AI model may be referred to as a "feature set."

The term "solver" may refer to a computational component that searches for a solution. For example, one or more solvers may be used to calculate a solution to an optimization problem. Solvers may additionally be referred to as "agents." A plurality of agents that work together to solve a given problem, such as in the case of ant colony optimization, may be referred to as a "colony."

The term "epoch" may refer to a period of time, e.g., in training a machine learning model. During training of learners in a learning algorithm, each epoch may pass after a defined set of steps have been completed. For example, in ant colony optimization, each epoch may pass after all computational agents have found solutions and have calculated the cost of their solutions. In an iterative algorithm, an epoch may include an iteration or multiple iterations of updating a model. An epoch may sometimes be referred to as a "cycle."

A "trial solution" may refer to a solution found at a given cycle of an iterative algorithm that may be evaluated. In ant colony optimization, a trial solution may refer to a solution that is proposed to be a candidate for the optimal path within an information space before being evaluated against predetermined criteria. A trial solution may also be referred to as a "candidate solution," "intermediate solution," or "proposed solution." A set of trial solutions determined by a colony of agents may be referred to as a solution state.

A "graphics processing unit" or "GPU" may refer to a programmable logic chip specialized for display functions. A GPU can be used to perform computations on large blocks of data in a parallel fashion. For example, multi-core GPUs may be used to execute an optimization algorithm performed by multiple computational agents in a distributed framework.

DETAILED DESCRIPTION

In the description below, an overview of a method for performing autonomous learning is provided. If an artificial intelligence (AI) model is trained once, it may become outdated and fail to provide relevant outputs. And, even if the training set is updated, but the same features are used, the AI model (or just AI) can also fail to provide optimal results. For example, in dynamically changing environments, the remembered patterns may become irrelevant or less predictive over time, and the AI may begin making poor predictions rather than good ones. To address this problem, some embodiments can learn new features for training the AI model, and thus continue to evolve to recent changes in information, thereby providing more optimal results.

In some implementations, an information space can be analyzed to determine suitable features for training the AI model. The information space may be represented as a topological graph of nodes connected by edges, which can have assigned weight, distance, or cost. Depending on the application, the value assigned to an edge (i.e. the strength of the connection between two nodes) may be characterized as a weight, distance, or cost. For example, for a graph representing a communication network, the value assigned to each edge may represent the distance that messages may need to travel from point to point. In another example, for a graph representing a highway construction plan, the value assigned to each edge may represent the estimated cost of building a road between two points.

An artificial intelligence model may make predictions about the information space using a learning algorithm that evaluates the position and connectivity of the nodes in a graph and recognizes patterns. The patterns may be reinforced by an indication that an outcome predicted using the AI model was correct or incorrect, which may further have an effect on the AI model. Accurate predictions and the recognized patterns that lead to those predictions can be remembered so that more accurate predictions may be made in the future.

Some embodiments can use optimization and binning of data to generate an updated feature list for training an AI model. For example, an updated feature list may comprise information indicating which restaurants are trending in San Francisco or which products are trending for millennials. The AI may then learn from this information, so that recommendations tailored to each user may quickly be generated.

For updating a feature list, the optimization may use a colony of computational agents that search for optimal paths in the information space, as defined by a cost function and in relation to a target goal. For example, the computational agents may find an optimal set of paths in a graph, e.g., where nodes for users are connected to nodes of objects (e.g., products) that provide the lowest computational cost for a path along edges. Each computational agent may iteratively search a different set of nodes in the graph for a solution (path), until predetermined cost and error requirements have been achieved. For example a set of computational agents may search a graph of a communication network until a routing plan for sending messages from point A to point B in less than one minute (cost) at a 99% success rate (error) has been found. An AI may use determined paths as training data for making predictions. In other words, optimal paths may be seen as information that allows an AI to make accurate predictions in the most efficient manner.

Once optimal paths are found, the data for the paths may be binned, such that paths that represent similar information may be combined. This may reduce redundancy, as well as reduce the number of degrees of freedom of the information that is input into the AI model. Binning of the paths may also be described as smoothing of features, as binning allows the AI to learn from a feature list that is sparse and uncluttered with noisy information. After optimal paths have been detected and binned, they may be compiled into an updated feature list and input into the model. The updated feature list may be formatted such that the AI may readily access the features as well as score them for their predictiveness. The learning algorithm may involve ranking the predictiveness of the features in the feature list, and only the most predictive features may be retained for making subsequent predictions. Thus, the invention described herein provides a method for autonomous learning that allows an AI model to make better predictions in a changing environment.

In the description below, an overview of machine learning models is provided, followed by an overview of autonomous learning embodiments. Preparation of an information space into a graph is described, as well as optimization of the graph. The detecting and binning of features is then described, followed by using a feature set for training. Example applications and further details (e.g., about parallel processing) are also provided.

I. PRELIMINARIES ON MACHINE LEARNING MODELS

Machine learning allows a model to learn from training data to provide a predicted output. A general flow of training and usage of a model is followed by a short description of types of machine learning.

A. Training and Use of a Model

FIG. 1 shows a high-level diagram depicting a process for training and using a machine learning model. Process 100 starts with training data, shown as existing records 110. The training data can comprise various data samples, where each data sample includes input data and known or inferred output data. For an example data sample, the input data can be the pixel values of an image, and the output data can be a classification of what is in the image (e.g., that the image is of a dog).

After training data is obtained, a learning process can be used to train the model. Learning module 120 is shown receiving existing records 110 and providing model 130 after training has been performed. As data samples include outputs known to correspond to specific inputs, a model can learn the type of inputs that correspond to which outputs, e.g., which images are of dogs. The training can determine errors between a predicted output of the model and the known or inferred output. These errors can be used to optimize parameters (e.g., weights) of the model so as to reduce the errors, thereby increasing accuracy.

Once model 130 has been trained, it can be used to predict the output for a new request 140 that includes new inputs. For instance, model 130 can determine whether a new image is of a dog. Model 130 is shown providing a predicted output 150 based on new request 140. Examples of predictive output 150 may include a classification of a threat, a classification for the authentication of a device to access a resource (e.g., a building or a computer), or a classification of a user seeking a recommendation (e.g., a recommended response from a chatbot or a recommended restaurant or answer to another query). In this manner, the wealth of the training data can be used to create artificial intelligence that can be advantageously used for a particular problem.

B. Example Types of Learning

Machine learning may include supervised learning, unsupervised learning, and semi-supervised learning. In supervised learning, each input is related to a corresponding target output that provides feedback about an error of the model so that the training can increase an accuracy of the model in predicting an output. In such a training method, training data that matches sets of inputs to corresponding outputs is provided to the model. For example, training data may match a set of pixels to a known classification of "dog."

However, in unsupervised learning, the data used to train a model primarily consists of inputs where the structure or relationship of the inputs to outputs is not readily known. The artificial intelligence model may be tasked with discovering the structure and relationships contained in the data. For example, a machine learning model may be given transaction data for a set of consumers and merchants in San Francisco. The unsupervised learning can identify groups of common tastes and preferences. Although certain embodiments may refer to unsupervised learning, embodiments may be implemented for supervised, unsupervised, and semi-supervised models. Examples of unsupervised learning techniques include clustering, latent variable models, blind signal separation, and principal component analysis.

In semi-supervised learning, the data used to train a model may include unlabeled data in conjunction with labeled data. The labeled data may be data that may be used to fit the data to a known structure (i.e. supervised learning), while the unlabeled data may be used for further training and greater learning accuracy. Clustering may be performed using the unlabeled data, and each cluster may be labeled according to the known structure provided by the labeled data. For example, for a plurality of transaction data in a transaction network, transaction data labeled as fraudulent and authentic may be provided with unlabeled transaction data in a graph. The transaction data may be clustered such that a clear boundary exists between transaction data labeled as fraudulent and transaction data labeled as authentic. The clusters comprising the fraudulent transaction data and authentic transaction data may be labeled as high probability of fraud and low probability of fraud respectively, and new transaction data received during learning can be identified as fraudulent or authentic based on its position in the graph relative to each cluster.

C. Graph Topology

One form of machine learning is graph-based machine learning, which is based on graph topology. A topological graph G may comprise data for an information space represented by a set of nodes V. Each node may represent specific information for an event (e.g. transaction, recommendation, login attempt, etc.) or may represent specific information for a profile of an entity or object (e.g. user, login device, obstacle, etc.) The nodes may be related to one another by a set of edges, E. An edge may be described as an unordered pair composed of two nodes as a subset of the graph G=(V, E), where is G is a graph comprising a set V of vertices (nodes) connected by a set of edges E. For example, a topological graph may represent a transaction network in which a node representing a financial transaction may be connected by edges to one or more nodes that are related to the transaction, such as nodes representing information of a device, a merchant, a transaction type, etc. The nodes connected to the transaction may further be connected to other nodes by other edges, such as nodes representing a user age, a user gender, a merchant type, a merchant location, etc.

An edge may be associated with a numerical value, known as a weight, that may be assigned to the pairwise connection between the two nodes. The edge weight may be identified as a strength of connectivity between two nodes and/or may be related to a cost or distance, as it often represents a quantity that is required to move from one node to the next. The value of an edge weight may be determined based on an actual measured quantity such as travel time, currency, computational cost, energy, etc.

For example, an edge weight may represent the length of a route, the capacity of a communication line, or the energy required to move from one state to the next. The connections between nodes, as defined by corresponding edges and weights, may be evaluated in order to determine optimal routes or movements, such as to reach an end goal in the most efficient manner. For example, the edges in a graph for a communication network can be evaluated to find an optimal route for delivering a message to all nodes using the least amount of resources or in the least amount of time (i.e. traveling salesman problem). Various optimization techniques may be used to find optimal paths in a graph, as further described in section IV below.

In another example, edge weights may be determined based on financial transaction data such as quantity and dollar amount of transactions. In this example, a server computer may be programmed to determine, based on transaction data, a degree of similarity between two nodes (e.g. similarity between two consumers). The edges weights may be characterized as a computational cost for determining the similarity between two nodes, and an optimization technique may be used to find an optimal set of paths for connecting similar nodes at the lowest computational cost.

Figure 2:
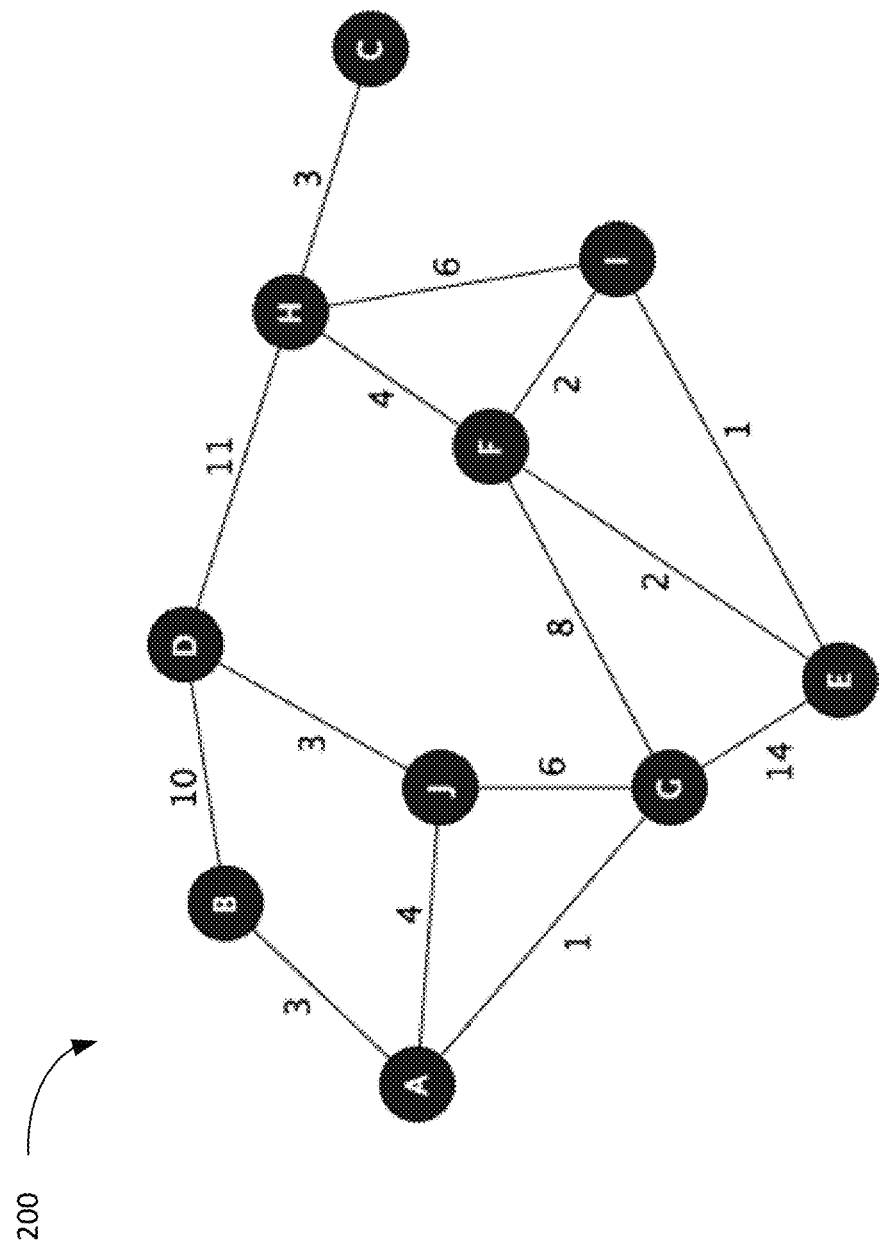
FIG. 2 shows a depiction of a topological graph according to embodiments of the invention.

FIG. 2 shows a depiction of a topological graph. Graph 200 is composed of nodes labeled by letters (A through H). Each node, A-H, may represent a specific event, entity, or characteristic thereof. For example, node A may represent a user (i.e. user A) in a social network, and nodes B, J, and G may represent users who are friends with user A or may represent posts liked or events attended by user A. The nodes are linked to each other by edges labeled by associated connection weights.

For example, the weight for the connection between node A and node G is 1 (relatively weak), but the connection between node G and node E is 14 (relatively strong). This may, for example, represent a degree of commonality between two users of a social network. The connections in graph 200 may be evaluated in order to achieve a desired outcome. For example, an AI model may be created for suggesting friends in a social network, and a learning algorithm may use the information of graph 200 as training data for predicting which users likely know each other. For example, the AI model may recognize that B and H are both highly connected to node D, and may suggest user B as a friend to user H.

As explained above, edge weights can also be characterized as costs. For example, graph 200 may represent nodes in a network in which the edges are connection channels. The edge weights can be representative of the time it takes to send a message between two nodes (i.e. the temporal cost of sending a message). An AI model for predicting the fastest routes for sending a message may evaluate the connections represented in the graph using a learning algorithm. For example, the AI model may predict the fastest route from node A to node C based on a route which has the lowest edge weight (i.e. route: A-G-F-H-C).

D. Selection of Nodes as Input Features to an AI Model

Figure 3:
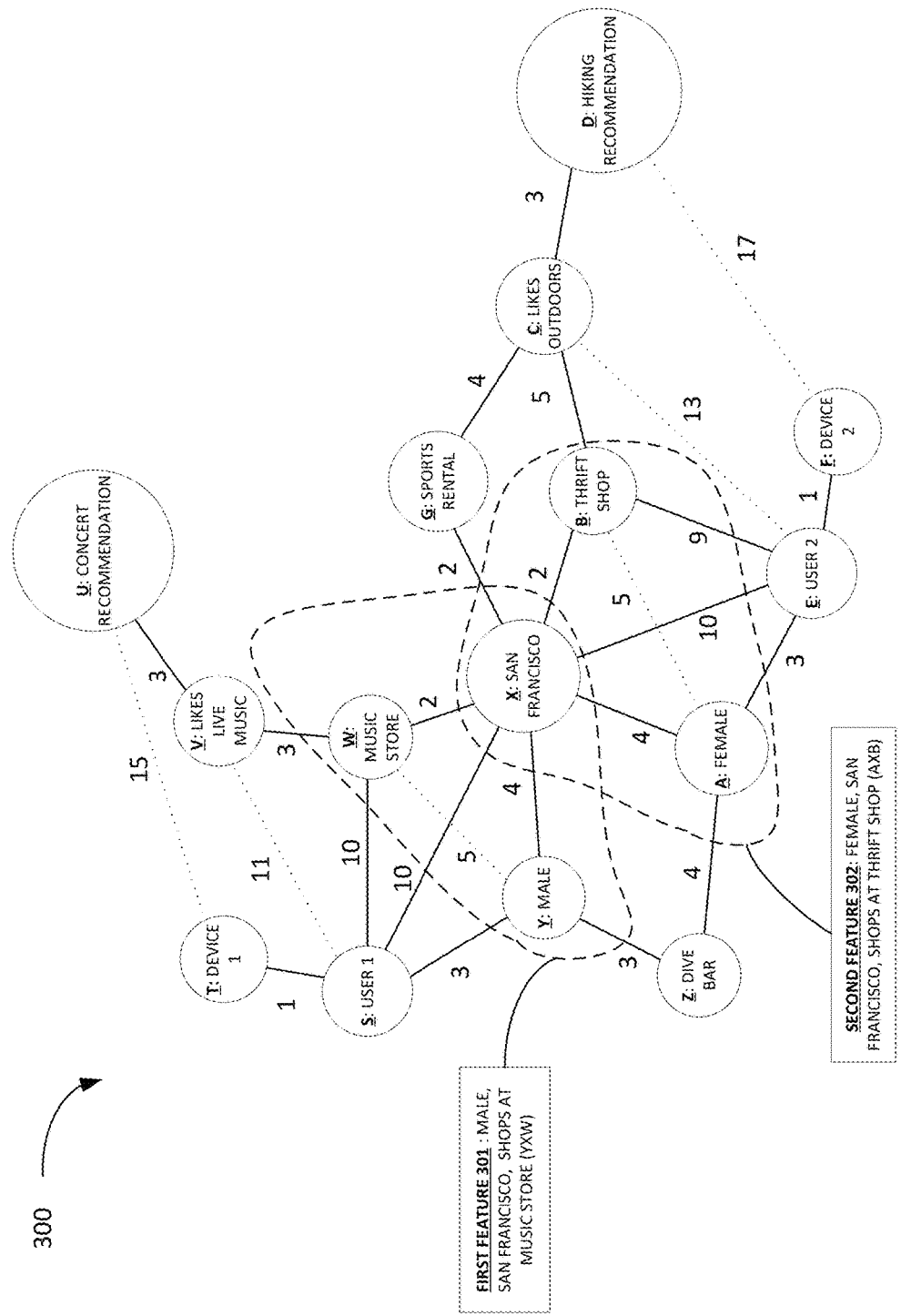
FIG. 3 shows a depiction of selecting input features from a topological graph.

FIG. 3 shows a depiction of selecting input features from a topological graph. In graph 300, each node (A through G, S through Z) may represent a specific set (e.g., one piece or a collection) of information determined from collected data. In the example shown, each node represents a label that can be applied to data collected in a transaction network. The solid lines represent measured relationships between two nodes, while the dotted lines may represent relationships between two nodes that are inferred. For example, the solid lines may represent relationships that are directly calculated from known interactions between two nodes (e.g. financial transactions between two parties), while the dotted lines may be relationships inferred using a learning algorithm (e.g. two parties that are likely to conduct a financial transaction in the future). The solid and dotted lines may be referred to as factual edges and inferred edges respectively, and are further discussed in section III-D below.

In the example shown, each edge shows the relationship between any two labels in the transaction network (e.g. node E: 'user 2' and node F: 'device 2' are related because device 2 belongs to user 2). Each edge can be assigned a weight representing some sort of value associated with the relationship between the two nodes. In the example shown, the weights represent the degree of similarity between two labels that are related (e.g. node E: 'user 2' and node F: 'device 2' are highly similar, while node E: 'user 2' and node B: 'thrift shop' are somewhat similar).

The information of graph 300 may be used as training data for an artificial intelligence model. For example, an artificial intelligence model may use the information of graph 300 to learn which recommendations should be sent to each device in a network, such that the recommendations are acted upon by a user. The AI model may learn (i.e. score) the predictiveness of input nodes (e.g. female, San Francisco, etc.) in the graph to a desired output (e.g. accepts hiking recommendation). For example, the AI model may determine that input node C: 'likes outdoors' is highly predictive of accepting a recommendation for 'hiking.'

Rather than score individual nodes for predictiveness, the AI model may score a collection of nodes, known as features. This may accelerate the learning process as well as require less memory for the AI to make accurate predictions. The features shown in FIG. 3 are the nodes enclosed by dashed lines (e.g., nodes Y,W,X and A,X,B). The features may be used to train an AI model, where a learning algorithm is used to train the AI and score the predictiveness of the features. For example, first feature 301: 'male, San Francisco, Shops at music store', may be used as a feature for predicting a recommendation to be sent to a user device. The user device may be associated with information identified as first feature 301, and the AI model may generate a recommendation associated with first feature 301 and score the predictiveness of first feature 301 based on feedback from the user device (e.g. whether or not the recommendation was accepted by the user of the device).

Features may be manually selected from the graph by one skilled in the art based on knowledge about the information space. This may done based on common sense rules and/or using any data mining technique, such as cluster analysis. For example, k-means clustering in combination with pre-defined rules (e.g. node Y: 'male' should not be of the same feature as node A: 'female') may be used to group nearby nodes into a single feature. Typically, new features that arise from the information space (e.g. trends in consumer behavior) may be manually identified and input into the AI model by one skilled in the art. According to embodiments of the invention describe herein, predictive features may be detected autonomously from a graph using the method provided in section II of this description.

Over time, the AI model may become better at predicting the best recommendations for each device in the transaction network. For example, the AI model may determine that second feature 302: 'female, San Francisco, shops at thrift shop' is highly predictive of a recommendation for 'hiking' being accepted. A server computer may then be instructed to send a message comprising a recommendation for 'hiking' to a user device closely related to second feature 302, such as node F: 'device 2.'

II. METHOD OF PERFORMING AUTONOMOUS LEARNING

Figure 4:
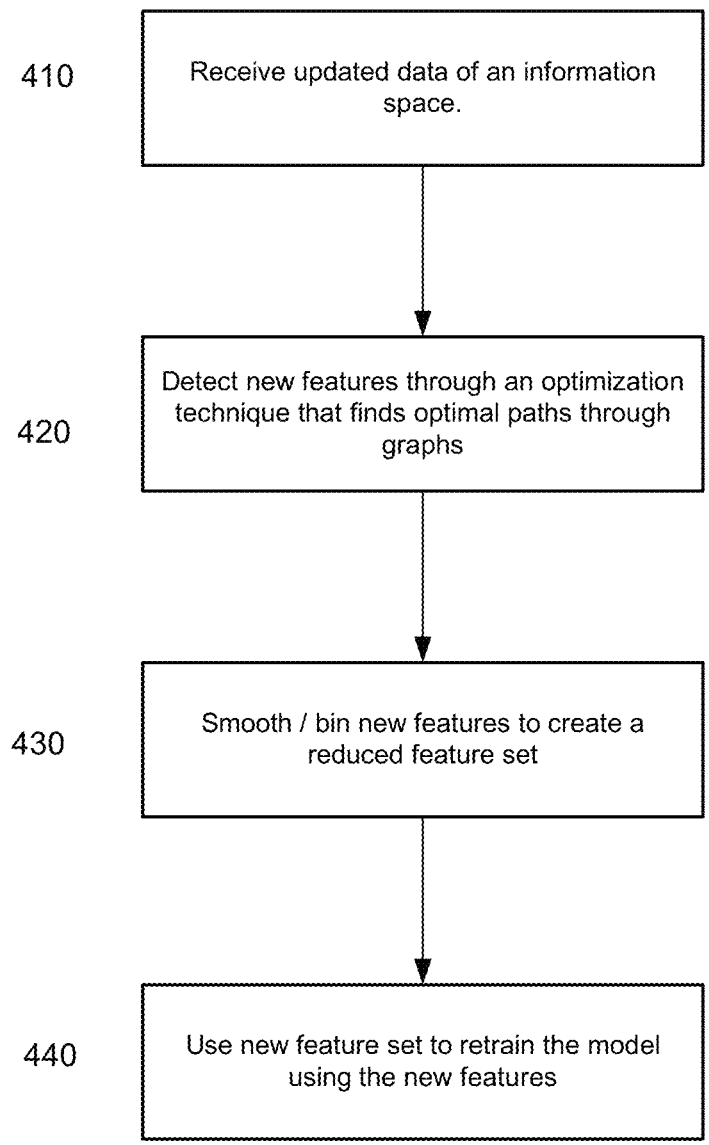
FIG. 4 shows a flowchart of a method for performing autonomous learning according to embodiments of the invention.

FIG. 4 shows a flowchart of a method 400 for performing autonomous learning according to embodiments of the invention. An artificial intelligence model may learn information about a specific information space (e.g. the cumulative interactions between consumers and merchants and each of their characteristics) and may be trained to make predictions about the information space based on detected features.

At step 410, an autonomous learning algorithm may first receive updated data of the information space. The information space may include a graph of nodes having a defined topology, where most of the nodes correspond to different inputs and some of the nodes correspond to outputs. An input may be any known or pre-defined characteristic of the information space, and an output may be any predicted outcome that depends on one or more inputs. Examples of an input may include transaction data, user profile data, text in a conversation, etc. Examples of outputs may include a targeted recommendation, a probability of fraud, a response to initiate a purchase, etc.

Besides the graph of nodes, the information space may also include data for historical requests. Examples of historical requests may include financial transaction requests, requests for a recommendation, or request messages for a chat bot. The requests may provide known output values (e.g., fraudulent or non-fraudulent) or results, such as user feedback. During each update to the artificial intelligence model, the updated data may include the historical data of requests to the artificial intelligence model and output results associated with the requests. In addition, the input data may be split into different categories of input data, which may correspond to different input nodes of the graph. Once the necessary input data has been obtained, the process of updating new features to the artificial intelligence model may begin.

At step 420, the autonomous learning algorithm may begin by detecting new features through an optimization technique that finds optimal paths through graphs. The optimization technique may be configured to determine paths to reach an end goal that are shortest or the least expensive as it scans through the domains or regions of one or more graphs of the information space. An example of an optimization technique that may be used at step 410 may include an ant colony optimization algorithm. As a result of the optimization technique, new connections, and potentially new strengths or weights of connections between nodes may be determined. The new connections may be identified as inferred edges, and may be determined based on a cost function or goal function, such as a signal-to-noise criteria. An example of a signal-to-noise criteria may be, for example, a ratio of the number of fraudulent transactions vs. non-fraudulent transactions for given inputs in a detected path.

The optimization technique may use multiple agents (i.e. multiple solvers) that each pursue an optimal path to a given output node by evaluating the defined cost function at each epoch and then communicating the determined path information in the form of a gradient. The gradient may describe whether the cost function was successfully decreased for each of the respective paths determined by each of the agents and may describe the error between the identified paths and the target goal. If a proposed path has been determined to have reduced the cost function, then the path can be encouraged at the next epoch of the solution search, with the goal being to approach a global optimal path (i.e. shortest or least costly path within the information space to reach the specified goal). In this manner, new features may be added to the graph, in the form of newly inferred connections between input nodes and output nodes.

At step 430, the newly detected features may be smoothed (binned) to create a reduced feature set. The nodes of the graph may be grouped or formed into clusters, in which nodes that are close to each other in topology form a cluster and may have similar properties such as similar signal-to-noise ratio. Clusters with sufficiently high connection to a given output node may be identified as a possible input feature. A predetermined amount of input features may be added to a current set of input features to develop a new feature set or current version of the model. For example, 50 new input features can be added to a current set of 200 input features for the current version of the model. The 50 new features can be identified based on the connection strength to the selected output nodes by, for example, selecting the top 50 features based on a shortest distance from an output node. These previous input features and new features may form the candidate features that can be input into the artificial intelligence model for training and evaluation.

At step 440, the new feature set may be used to retrain the model using the new features. The training of the enlarged artificial intelligence model may be performed using the historical data for candidate input features, and the training may provide a ranking of the candidate input features relative to a measure of their effect on an output value of the enlarged artificial intelligence model. The top "n" candidate input features may be used in the updated artificial intelligence model. In one embodiment, the features in the enlarged feature set may be ranked according to strength of correlation to a predicted outcome, and the feature set may then be capped to its original size (e.g. ranking 250 features and then selecting only the top 200 features as the new feature set). In this manner, the artificial intelligence model may make predictions based on an updated feature set that may be better suited for the current state of the dynamic environment in which it is operating. This updated feature set may then be used by the AI model to interact with its environment until the autonomous learning algorithm is later re-run to provide a more current feature set.

III. PREPARING A MODEL FOR A DEFINED PROBLEM

To implement the method for autonomous learning described above, one can first prepare an AI model for solving a pre-defined problem. This may involve steps necessary for identifying the inputs and outputs for the AI model. Preparing the model may comprise specifying what information should be extracted from collected data (i.e. the information space). Model preparation may also comprise defining how nodes are generated on a graph (i.e. defining what information constitutes a node), defining how edges are generated (i.e. defining relationships between nodes), and defining the meaning of an edge weight with respect to the problem. A target goal specifying what constitutes a good prediction (e.g. accurate prediction of fraud, recommendations that lead to a purchase, successful blocking of a security threat, etc.) may be defined. A learning algorithm may be prepared to score features based on the error of predictions relative to the target goal, and the AI model may be trained to make future predictions using features that have scored well in the past.

A. Collection of Data

Data may be collected from an information space for which an AI model is making predictions. The information space may be any environment that may be broken down into elements of information that can be observed. For example, when observing a room, the information space may be all of the information about the room that may be perceived using the five senses or deduced using logic such as the size of the room, the objects in the room, the position of each object relative to each other, the purpose of the room, etc. Each piece of data collected from the information space may be collected at a point in time, or state, characterized by the elements of information that exist at that point in time. The purpose of an artificial intelligence model may be to predict what elements of information exist in the information space at a next point in time or next state, based on the data collected at a previous state. For example, for an artificial intelligence model used for identifying pictures of cats, data collected from previously presented pictures of cats (i.e. data collected at previous states) can be used to predict if a next presented picture is also a picture of a cat (i.e. predicting information contained at a next state).

Data may be collected in any number of ways, depending on the information space from which a problem is to be solved. For problems involving physical environments, data may be collected using sensors. For example, a camera or radar may be used to collect data about objects through the sensing of electromagnetic waves. For problems involving networks and the interaction of entities, data may be collected by assigning values to elements of information and tracking and recording their presence in messages. For example, individuals that interact with each other in a transaction network may be assigned an account number that is associated with profile data and is tracked and recorded each time an interaction involving the individual occurs. The data may be sent in the form of a message or request (e.g. authorization request message), such that the data may be extracted/copied and then stored. For example, a request to access a building involving 'user ID: 12039' may be received by a server computer, and the server computer may store a record of the request in a database. The record may include data for 'user ID: 12039' and data for other information elements for the interaction that can be tracked such as 'location=San Francisco,' 'building=building 2,' 'time of day=4 pm,' etc.

B. Generating Nodes from Collected Data

An artificial intelligence model may learn from a set of collected data that is expressed as a graph characterized by nodes whose connection to one another are expressed as edges. Nodes within the graph of the information space may correspond to specific pieces of information collected from data. For example, for a given information space representing data collected in a transaction network, any given piece of information extracted from a transaction may be expressed as a node (e.g. account number, device ID, merchant category code, transaction type, etc.). In another example, for a given information space representing data collected from a physical environment, a node may correspond to information that is measured by a sensor (e.g. temperature, pressure, air density, etc.).

The accumulation of a node's historical data may define its position and connection to other nodes in the graph, as represented by edges. The cost (weights) of the edges may be determined based on a mathematical relation between information elements of historical data and their effect on a measured output. For example, in a transaction network, edge weights between nodes (e.g. merchants and consumers) may be calculated using a mathematical formula or predicted using a mathematical model that expresses the relationship between transaction data and likelihood of a future transaction being conducted.

Edge weights between two nodes may also be characterized distances, in which nodes separated by a shorter distance are more likely to contain similar information. The nodes may then be grouped or clustered together into communities based on their proximity to one another. For example, nodes corresponding to merchants in San Francisco may be clustered closer to one another than to nodes corresponding to merchants in Singapore. In another example, a node for the color 'light blue' may have a shorter distance to a node for the color 'blue' than a node for the color 'red.' Thus, nodes for different shades of blue may be clustered together, while nodes for different shades of red may be clustered together.

C. Edge Structure for Feature Detection

As described in section I-D above, nodes within a graph may be grouped into features that can be input into an AI model to facilitate learning. The nodes may each represent an information element that may act as an input for making predictions and may be connected to a given output via an edge at a given cost. A proposed feature for an AI model may comprise a collection of nodes. Features may be generated by creating paths that connect input nodes to output nodes. The total cost of a path may be the sum of individual costs of edges from a first input node, through other input nodes connecting the first input node to an output node in series. The total cost may indicate the computational cost for using the path to link the first input node to the output node, thus indicating the computational cost for using the path as a predictive feature.

For example, referring back to FIG. 3, one path for linking node T: 'device 1', to an output node for node U: 'concert recommendation' may be a path that starts at node T and then connects to node S: 'user 1,' then moving along the connection between node S and node W: 'music store,' followed by the connection between node W and node V: 'likes live music,' and then ending at node U: 'concert recommendation.' The total cost of this path may be the sum of edge weights along the path, (i.e. 1+10+3+3=17). Therefore, linking user device 1 to a concert recommendation using the path of 'SWV' may come at a cost of 17. If the path is found to reduce a cost function for reaching a target goal (e.g. reducing the cost of linking a set of users to recommendations that they have a high probability of acting upon), then the path 'SWV' may be used as a feature for making predictions. The feature may be scored during training, in which the weight of an inferred edge between node T: 'device 1' and node U: 'concert recommendation' may be changed (e.g. user 1 accepts the concert recommendation and a connection between user 1 and a next concert recommendation may be changed to 15).

In another example, for an AI model used for predicting fraud in a transaction network, a path in a graph of the network may include an input node for a specific credit card that is connected to a series of nodes for other transaction data (e.g. time, location, etc.) that ends in a connection to an output node representing fraud. The total cost of a path from the input node to the output node may be found by summing the cost of each edge in the path. There may be multiple paths that link the input node for the specific credit card to the output node for fraud. However, the path with the lowest cost may be the path that can link the credit card to fraud using the least amount of computational resources, and thus may be a good candidate for a predictive feature to the AI model. The predictive feature may be scored during training (i.e. adjusting the strength of the connection between the feature and fraud), which may affect how the feature is used in future predictions.

In a specific example, a transaction having a set of characteristics represented by 'card present,' 'time of day=afternoon,' 'day of the week=weekend,' may connect to an output node of 'fraudulent transaction.' A path starting at a 'card present' node to an output node of 'fraudulent transaction' may pass through nodes for 'time of day=afternoon,' day of the week=weekend,' and may have a total length equal to the edges that connect these nodes. These nodes and the edges that connect them may be seen as a feature that may exist within the information space, despite not being explicitly defined as an input variable. For example, the nodes of 'card present,' 'time of day=afternoon,' 'day of the week=weekend' may be associated with a specific type of shopper who is likely to commit fraud. The specific type of shopper may be identified as a feature or latent variable that may be later used to predict specific outcomes, such as an instance of fraud or a propensity to purchase a specific item.

Detected features of an information space may be used to make predictions for future requests. For example, if a transaction is conducted with a new merchant, a profile of information may be created for the merchant in which characteristics such as 'merchant type: fast food,' and 'location: San Francisco,' may characterize the merchant and be used to draw a connection between an input node for the merchant and other input nodes that are already present in the graph. If the profile information contains information identified as a predictive feature, the AI model can make a prediction based on the feature and its scored predictiveness. This may be done by evaluating the feature's relation (i.e. edge weight) to a given output node, such as an output node of 'high probability of fraud,' or 'low probability of fraud.'

D. Types of Edges

According to embodiments, two different types of edges may be used to represent features within an information space—factual edges and inferred edges. These two types of edges may be represented by two different parameters within the autonomous learning algorithm and may be generated or obtained in distinctly different ways as described in further detail below.

1. Factual Edges

A factual edge may be a connection between two nodes that is confirmed to represent a known feature based on data that is confirmed and directly expressed in the graph of the information space. For example, a factual edge may be generated between a particular merchant node and a given gender node upon loading of a demographic database where the ratio of male consumers to female consumers for the particular merchant has been recorded. In another example, a node may represent a specific payment card and a factual edge may connect the node to an output node of 'fraudulent,' based on reported instances of fraud. In yet another example, a factual edge may be created between consumer and merchant nodes based on recorded transactions between them. Referring back to FIG. 3, the factual edge between node S: 'user 1' and 'node Y: Male' may be based on profile data of user 1 (e.g. user selects 'male' when creating a profile). Similarly, the factual edge between node S: and node X: 'San Francisco' may be based on location data (e.g. GPS data), and the factual edge between node S and node W: 'Music Store' may be based on transaction data (e.g. a list of transactions conducted between user 1 and the music store).

2. Inferred Edges

An inferred edge may be an edge that is detected or 'inferred,' through learning. For example, a transaction having a set of characteristics represented by a 'card present,' 'time of day=afternoon,' and 'day of the week=weekend' may form a path to an output node of 'fraudulent transaction.' The factual edges that make up this path may be identified as a feature of the information space, and an inferred edge between the transaction and the output node may be generated. The inferred edge may communicate a same type of information as the path of factual edges, but may communicate the information to the AI model at a lower cost. Therefore, the AI model may quickly generate a prediction upon identifying that the feature is present in a request.

The inferred edge may represent information that may not be explicitly communicated in collected data, but may still infer a possible feature that may exist within the information space. In this manner, the purpose of the autonomous learning algorithm may be to create structured data. The inferred edges may be identified as a parameter that is separate from any factual edge, but may nonetheless be used to draw a connection between an input node and an output node and predict outcomes that may arise from the information space.

For example, referring to FIG. 3, an inferred edge may be created between node A: 'Female' and node B: 'thrift shop,' indicating that the probability of a transaction at the thrift shop is higher for women than men. The inferred edge may have been created after finding that a set of characteristics that are highly connected to node A are also highly connected to node B (i.e. finding low cost paths). In this example, transaction data for transactions conducted at the thrift shop may not specify the gender of each user in a transaction. However, each user in a transaction may be linked to a gender from social media data, thereby creating a set of paths from node A to node B. The inferred edge may be representative of a latent variable, in that it may be representative of real characteristics not explicitly specified in collected data (e.g. the thrift shop may have a significantly large amount of women's clothes compared to men's clothes).

IV. OPTIMIZATION

An optimization technique may be used to determine optimal paths in a graph. The optimization technique may be used to determine a shortest path to a given output node and/or a set of paths that achieves a particular goal at the lowest cost. This may lead to detecting new features of an information space that are better suited for making predictions than features used to make predictions at previous states. For example, an AI model may become over-fitted to make predictions based on a pattern that no longer exists (e.g. the lighting in a room has changed or a type of product is no longer trending) and optimization may be performed in order to identify which inputs and outputs are now highly connected at the current point in time (e.g. an object in a room is now more connected to a brighter color node than before or users are now highly connected to a node for a new product).

One or more connective paths comprising various edges may exist that connect a given input node to a given output. In one embodiment, a learner goal may be defined, and an optimization technique may be used to determine the shortest or least costly path toward the defined learner goal. The one or more paths may be determined using the optimization technique and evaluated for cost and effectiveness.

A. Minimum Spanning Tree

A minimum spanning tree or minimum weight spanning tree may be a subset of edges that connects all nodes of a node graph together without repeating paths and while maintaining the minimum possible total edge weight. When determining an optimal set of paths within a weighted connected graph, the solution can be approximated by finding a minimum spanning tree. For example, when using a graph to determine an optimal travel plan for visiting a list of cities using the least amount of fuel, a path of edges (roads) connecting nodes (cities) that make up a minimum spanning tree can be found. A minimum spanning tree can be found from a graph using a number of optimization algorithms and techniques, such as Boruvka's algorithm, Kruskal's algorithm, and decision trees.

B. Ant Colony Optimization

One optimization technique of particular use for finding optimal and/or least costly paths within a graph may be ant colony optimization. Ant colony optimization is a method for finding optimal solutions that is similar to genetic algorithms. Both ant colony optimization and genetic algorithms utilize the probabilistic technique of simulated annealing, and both techniques are based upon ideas seen in biology. Genetic algorithms are optimization methods that iteratively modify a set of individual proposed solutions or "population" until an optimal solution is found after a number of successive iterations or "generations." In such algorithms, information regarding a solution's accuracy or "fitness" is only communicated between solvers that are within a specific domain of the graph that is "selected." This may cause such algorithms to converge to a local optimum or the quickest suitable solution, rather than the global optimum of a graph. In some instances, a genetic algorithm may be effective in locating the global optimum of a graph; however, it may take a considerably long time, as multiple generations of solutions may be required to gain insight into the entire information space as a whole.

By contrast, an ant colony optimization technique is based off of a collective hive perspective. In ant colony optimization, multiple agents or solvers attempt to find an optimal solution, and may collectively communicate feedback or "pheromones" to one another. These pheromones are recorded and may relay information at each iteration about the effectiveness (e.g., a gradient or other error term) of their respective solution paths relative to the overall goal. The solvers may be spread out amongst the entire information space and communicate with the entirety of agents or "colony," thereby allowing such methods to better approach solutions that are globally optimal, despite there being a local optimum within an evaluated domain. An additional advantage of utilizing an ant colony optimization algorithm is that it may be possible to configure multiple learner goals within the algorithm. That is, a learner goal may be expressed in a number of ways. For example, one may configure the agents in the ant colony algorithm to search for a path according to signal-to-noise, shortest path, smoothest topology, etc.

Figure 5C:
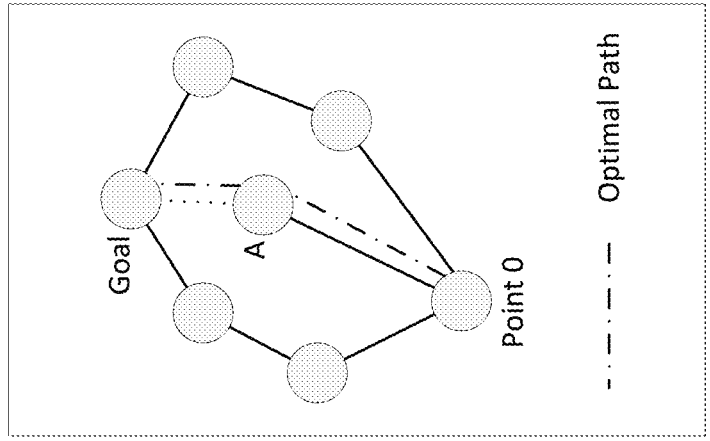
FIGS. 5A, 5B, and 5C show an illustration of ant colony optimization.
Figure 5B:
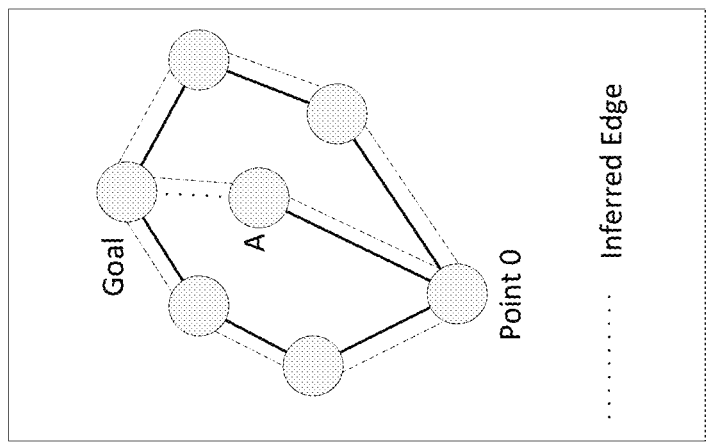
Figure 5A:
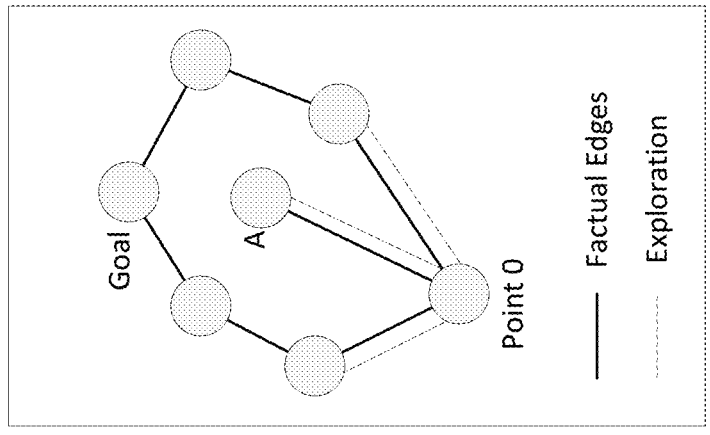

FIGS. 5A-5C shows an illustration of ant colony optimization. The illustration shows the search for an optimal path by computational agents. In FIG. 5A, the agents are initialized for a graph of nodes (shown as circles) connected to one another by factual edges (shown by solid lines). Each individual agent initially starts at point 0 and may begin a random search for a path towards the goal, taking its own individual path towards a solution. In FIG. 5B, the agents may begin exploring the information space, and may communicate, to the other agents, path information (i.e. pheromone). The path information may comprise cost information, and least costly paths may be reinforced as approaching an optimal path. An inferred edge (shown as a dotted line) may be determined from the path information. The inferred edge may be a connection between two nodes for which path information indicates a relationship may exist, despite the lack of any factual edge representing the relationship. The inferred edge may allow for a shorter path between an initial point and the target goal. For example, an edge may be inferred between point A and the target goal, which may allow for a shorter path between point 0 and the goal. In FIG. 5C, the agents may follow the path in which the pheromone was dropped rather than moving at random as before. This may lead the agents to reach the target goal at a faster pace, and finalize their solution search at the optimal path.

Drawing upon this analogy, the overall path that is taken by the agents when finding a solution can be determined based on the error structure (e.g., gradient) of the information space in relation to the target goal. A random search may be performed by the agents, with each of the agents initialized within a given domain of the information space. Each of the agents may then move from their initial point and begin simultaneously evaluating the surrounding nodes to search for a solution. The agents may then determine a path and may determine the cost of the path and compare it to a predetermined cost requirement. The agents may continuously calculate the cost of their determined paths until their chosen path has met the predetermined cost requirement. The agents may then begin to converge to a solution and may communicate the error of the chosen solution in relation to the target goal. The agents may update a global pheromone indicating the error gradient, which may be used to bias the distribution of the agents towards a globally optimal solution at the start of each iteration (e.g. by weighting the distribution of agents towards low error regions of the graph). The agents may then repeat the random search until the global optimum has been found or the goal has been sufficiently met.

Figure 6:
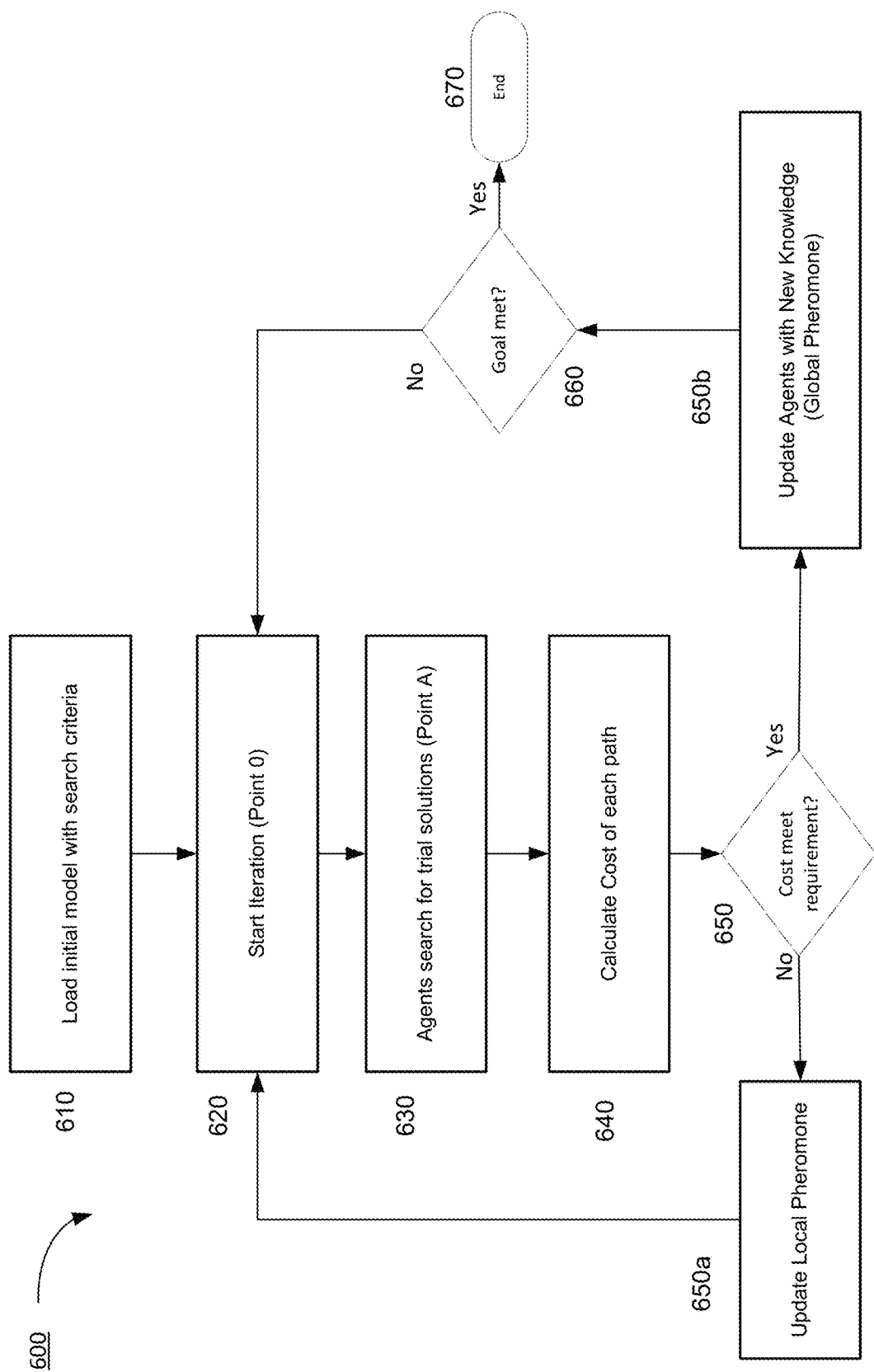
FIG. 6 shows a depiction of a process flow diagram of an ant colony optimization algorithm.

FIG. 6 shows a depiction of a process flow diagram of an ant colony optimization algorithm. According to embodiments of the invention, an ant colony optimization algorithm may be implemented in order to detect cost effective paths between input nodes and output nodes within the information space.

At step 610 an initial model with search criteria may be loaded. The search criteria may include, for example, a definition of the target goal, a definition of cost and predetermined cost requirement, a time step (cycle duration), a quantity of agents (colony size), and an initial state or initial distribution of agents.

At step 620, the agents may start at an initial state at point 0, which may be the current solution or state that each of the agents have currently arrived at for the start of any given iteration. For example, at a first iteration, the agents may be randomly distributed across the entirety of the information space. In later iterations, the agents may be initialized such that they are closer to the domain in which the global optimum exists, as communicated by recorded pheromones over time. In this manner, the agents may be initialized based on a weighted random distribution.

At step 630, the agents may begin searching for trial solutions to arrive at a next state, point A, which may be the state at which each of the agents have found a trial solution for the current cycle. For example, an individual agent may move from a first state x to a next state y. State y may correspond to a more complete intermediate solution that is closer to the final state in which the optimal path is found. Each agent can move a variable amount based on path information, such as the gradient or based on a local pheromone regarding a paths effect on a cost function.

At step 640, the cost of each of the solutions or paths detected by each of the agents may be calculated as defined by the original search criteria. Examples of cost calculations may include taking the sum or inverse of the sum of weights between nodes in a given path or may include calculations based on a signal-to-noise criteria in which paths with a higher powered signal may reduce the cost function. In one example, a colony of agents may be initialized for the purpose of determining good paths for detecting fraud, such that a path that is more indicative of fraudulent behavior (i.e. signal) versus non-fraudulent behavior (i.e. noise) may be considered a low cost path and may be reinforced at a later iteration. The cost of a given solution may be characterized as the desirability or attractiveness of a given move or state transition.

At step 650, the cost determined for each of the detected paths may be evaluated and compared against a predetermined cost requirement. In one embodiment of the invention, a path may only be identified as a candidate solution if it sufficiently reduces the cost function. Otherwise, local path information (i.e. a local pheromone) may be recorded or updated, and the agents may continually attempt to approach a less costly solution within each subsequent iteration until the cost requirement has been met. For example, an agent may determine a path or set of input nodes that only indicate a 50% probability of fraud, and the agent may continuously evaluate nearby paths until a better predictor of fraud has been found.

If at step 650 it is determined that the cost requirement has not been met, then step 650a may be performed. At step 650a, each of the agents may update local path information to indicate the calculated cost of a proposed solution within its searched region of the graph. The agents may be initialized again at a next iteration to search for a less costly solution. Steps 620 to steps 650a may be continuously cycled until the cost requirement is finally met. As the agents search for a next solution state, the agents may be affected by the trail levels of each path as determined by local pheromones recorded in previous iterations. A particular agent may be influenced by the costs of paths within the specific portion of the domain being searched, as calculated during a previous iteration, which may lead the agent to choose a different path or different point A at the current iteration. For example, the probability of a path being chosen by an agent during an iteration may be a parameter that depends on the cost calculated for the path during the previous iteration. Therefore, there may be a higher probability that the path chosen by an agent during each consecutive iteration may be one that has a reduced cost in comparison to paths chosen at previous iterations, thus allowing the colony of agents to better meet the cost requirement after each cycle.

If at step 650 it is determined that the cost requirement has been met, then step 650b may be performed. At step 650b, the agents may be updated with new knowledge about the position of the global optimum based on the current state of the recorded pheromones for each the agents (i.e. update global pheromone). The paths or solutions may begin to converge to a particular solution, and the determined path may then be communicated to the agents. For example, the agents may begin to identify a set of input nodes that are strongly linked to a high probability of fraud, and may begin to find paths involving those nodes to converge to a solution. After updating the global pheromone, the process may return to step 620 to begin an additional iteration at a new point 0. At the new point 0, the distribution of agents may be biased or weighted towards a particular solution based on the information from the previous iteration, as communicated by the global pheromone. The agents may then continue to approach this solution in subsequent iterations until the target goal has been met.

At step 660, the error structure may be evaluated to determine if the predetermined goal has been met. In other words, it may be evaluated whether or not the global optimum, as determined by the colony of agents, is within an appropriate margin of error to a desired final condition or desired target. If at step 660, it is determined that the goal has not been met, then the agents may begin a subsequent iteration at step 620, and may continuously cycle through steps 620 through 660 until the goal has been reached. Once the goal has been sufficiently met, the final solution as determined by the colony of agents may be recorded and the solution search may terminate at step 670.

V. DETECTING NEW FEATURES

As explained in section IV above, new features of an information space can be detected using an optimization technique. The optimization can be a technique that finds the least costly paths within a weighted connected graph. Least costly paths may be found using ant colony optimization, and detected paths may be evaluated against a target goal to determine if the paths can be a new feature for training a model. In ant colony optimization, regions of the graph are searched by a colony of computational agents that iteratively search for low-cost paths until a target goal has been met. The target goal may be evaluated based on an error structure that expresses the successful predictiveness of regions in the graph as a gradient.

Features within the information space can be detected and/or inferred by the autonomous learning algorithm based on a pre-defined goal. The goal may be to determine an accurate indication of fraud, to generate a recommendation that may be accepted or acted on by a user, or any other outcome that may be determined by an AI model based on one or more features. The edge structure of the graph representing the information space may have a particular state, in which latent variables may exist but are not being expressed by any single input node or factual edge. The target goal can be achieved by creating structured data, from which new features may be detected. The new features may be identified and input into the AI model as inferred edges that the model may readily understand and learn from.

A. Solution Search

The information space in which an artificial intelligence model is operating in may be searched for a global optimum by a colony of agents (i.e. a plurality of solvers). The global optimum may be a state in which a set of features are determined to best provide structured data for the AI model to predict outcomes from. Data representing the information space may be loaded into one or more processors, and a colony of agents may be initialized to search a graph of the information space in a randomly distributed manner. The agents may search according to predetermined criteria which may include a quantitative definition of the target goal, time step, colony size, and distribution of agents.

Once the agents begin to calculate a solution, they may begin to determine the relative strength or correlation of various node paths to a particular output node. The agents may begin performing simulated annealing within their respective domains to search for an optimal path. This can be done simultaneously by the plurality of agents in the colony. As the agents search for a solution, there may be local optimums within a given region being searched by an agent. In particular, there may be a locally optimal path that may be distant from the global optimum or may be a relatively high cost solution. However, because the agents are simultaneously calculating over the entire information space in a random manner and recording their results, the colony can inherently account for local optimums and bias more towards a global solution with each consecutive iteration.

In one embodiment of the invention, a set of agents k may move from a state x to a state y, and each agent k may compute a set of feasible movements $A_k(x)$, where the probability of choosing a specific next movement is based on past information from previous iterations. For an agent k, the probability, $p_{xy}^k$, of moving from state x to state y may depend on the attractiveness of the move $\eta_{xy}$, which may be based on the move's effect on the cost function, and the trail level $\tau_{xy}$ of the move, which may be an indication of a move's desirability based on previous iterations as communicated by the gradient (e.g., error) of each agent, which are referred to as local pheromones. The agents may move from node to node along the edges of the graph of the information space, and may be influenced by the information provided by the pheromones previously recorded. The amount of pheromone recorded ΔT may depend on the quality of the trial solution found. On each subsequent iteration, the agents utilize the pheromone information to converge towards a region of the information space in which a solution that meets the required cost and/or achieves the target goal exists.

According to one embodiment, the probability of an agents choosing a selected path may be defined to be:

$$p_{xy}^k = \frac{\tau_{xy}^\alpha \eta_{xy}^\beta}{\Sigma_{z \in allowed_x}(\tau_{xz}^\alpha)(\tau_{xz}^\beta)}$$

where, $\tau_{xy}$ may be the amount of pheromone deposited for transition from state x to state y, $0 \leq \alpha$ can be a parameter to control the influence of $\tau_{xy}$, $\eta_{xy}$ can be the desirability of path xy based on its cost, $\beta \geq 1$ can be a parameter to control the influence of $\eta_{xy}$, and $\tau_{xz}$ and $\eta_{xz}$ can be the attractiveness and trail level for other possible paths.

B. Calculating Cost

The trial solution determined by each of the agents during a given iteration may be evaluated based on its cost. In one embodiment, the cost may be evaluated by determining a minimum spanning tree and comparing to the total weight of the determined paths. In another embodiment, the cost may be evaluated by determining a sufficient strength of signal for predicting the outcome in the information space and comparing against the signal-to-noise ratio of the selected paths. For example, it may be determined that an appropriate solution for grouping consumers into spending communities should yield a sufficient amount of good recommendations that lead to a purchase (signal) over bad recommendations that are largely ignored by a user or reported to not be applicable (noise).

The cost function may be modified depending on the target goal or problem being solved by the AI model. A heuristic or metaheuristic method may be used to define the cost function such that the agents may converge to a solution state that provides sufficient results for the information space and problem being solved by the AI model. This can be seen as defining the attractiveness of certain solutions for the agents a priori. In one embodiment, the cost function may be based on vectors that are weighted based on the detection of new information. If the agents at the current solution state have found a relatively small amount of new information in a given region of the graph, the vectors pointing towards that region may be reduced when updating the agents. In such an embodiment, the final vector or final solution state may be determined by choosing the path that maximizes potentially new information. In other words, paths consisting of mostly known information may be seen as more costly and may not be reinforced.

In one embodiment, vectors determined based on the presence of new or novel information may adjust the cost function in relation to the similarity between an agent's node and the node from which the novel information is coming from. It may be known that a next node in a path contains no additional information and is highly similar to the current node being evaluated. The agent may then perform a multi-node jump, therefore reducing the cost of a given path. In this manner, the calculation of the cost function may act as a collaborative filter, in which solution states involving similar nodes can be reinforced.

C. Updating Agents

According to embodiments of the invention, the agents searching for good paths within the information space may be updated depending on if the current solution state has met a predetermined cost requirement. If the agents have found a set of paths that do not meet the predetermined cost requirement, then each of the agents may update information regarding the region that was searched so that the agents may move closer to less costly paths in the next iteration. In one embodiment, each of the agents may update a local pheromone for a given trail or path within the graph according to:

$$\tau_{xy} \leftarrow (1-\rho)\tau_{xy} + \sum_{k} \Delta\tau_{xy}^{k}$$

where $\tau_{xy}$ can be the amount of pheromone deposited for a state transition xy, $\rho$ can be the pheromone evaporation coefficient, and $\Delta\tau_{xy}^{k}$ can be the amount of pheromone deposited by the kth agent. According to embodiments of the invention, the pheromone evaporation coefficient may be set in order to avoid or forget paths that prematurely converge to a local optimum in a sub-optimal region, and may encourage exploration of other regions in the graph that may contain new information.

If at a given iteration, it is determined that the cost requirement has been met, the agents may be updated with new knowledge of the region in which the global optimum may exist. The new knowledge may take the form of an update to the error structure or gradient of the graph relative to the target goal. In one embodiment, the new knowledge may be expressed as a global pheromone. At the start of a subsequent iteration, the distribution of agents may depend on the global pheromone, which may cause the agents to be distributed in a biased or weighted manner such that they may converge to the optimal region. Furthermore, the gradient may be expressed according to movement vectors, in which the agents may be attracted towards the globally optimal region of the information space. For example, agents looking for common features that are indicative of fraud may begin converging towards nodes corresponding to merchants that use a particular payment system that is vulnerable. In such an example, the payment system may not be identified or expressed by any individual characteristic or variable in the graph; however, the agents may still be able to converge to merchants that use the payment system based on shared commonalities.

D. Evaluating Error Structure

The error structure of the paths relative to the target goal may be evaluated to determine if predictive features have successfully been found. The error structure may be expressed as a distance function or a global gradient that may communicate how close a given state is to the target goal. In one embodiment, the error, $\lambda$, may be defined to be:

$$\lambda \frac{A \cap B}{\min(A-B)} + (1-\lambda)\frac{A \cap B}{\max(A+B)} = 0$$

where, A may be a set of features (paths) that have been found by the agents, and B may be a set of features that achieve the target goal. For example, the agents may determine a set of paths, A, that connect specific types of users to recommendations that they may have a high probability of acting upon, and may compare the paths to actual recommendations accepted by the users, B, in the information space to determine the error, $\lambda$, of the determined set of paths. If the error of the detected paths at a solution state is within a predetermined margin relative to the target goal, then the final state may be arrived at, and the solution paths that the agents have found may be identified as candidate features for the AI model.

In one embodiment, the determination of whether a particular path of a proposed solution state achieves the target goal may be expressed in binary fashion. For example, a particular consumer may be identified by a set input nodes for a specific path in the graph found by the agents, and the AI model may generate a recommendation to the consumer based on the feature corresponding to the path. If the consumer then makes a purchase associated with the recommendation, then a positive indication of '1' may be accounted for in the error structure when the error is calculated and evaluated, and the specific path may be seen as an intersect between the current solution state and the target goal. Otherwise, if the consumer does not act on the recommendation, a negative indication of '0' may be recorded and may not be considered an intersecting element, thus adding to the error of the current solution state. In another embodiment, the error of a given path may be expressed as a real number. The value may be used to express a degree of success of a path at achieving the target goal. For example, for an error structure associated with the relative success of a recommendation against purchases associated with the recommendation, the value may convey a transaction amount, a number of purchases, a customer satisfaction rating, etc.

E. Compiling Candidate Features

After optimization has been performed to find good paths in the graph of the information space, the paths may be compiled so that they may be evaluated as candidate features for the AI model. The paths may be recorded as inferred edges, which may act as a separate parameter from the factual edges of the graph, but may nonetheless be used by the AI model to make predictions or achieve the desired outcome. For example, an AI model attempting to provide recommendations to consumers may learn from the inferred edges. The AI may draw similarities between a node for a new restaurant and other nodes having similar features which may be of other trending restaurants or of consumers that tend to favor said trending restaurants. When looking to provide a recommendation to a specific type of consumer, the AI may infer an edge between the consumer and the new restaurant if they are both associated with information contained in a candidate feature. The AI may then recommend the new restaurant to the consumer in order to achieve a target goal of generating revenue and/or increasing customer satisfaction.

VI. BINNING DETECTED FEATURES

The paths determined through optimization may be binned in order to provide a feature set to the AI model. The smoothing or binning of detected features can be performed such that a reduced feature set is generated. Paths that are nearby or that have similar signal-to-noise ratios may be combined into a single feature in the updated feature list from which the AI model can learn from.

In order to obtain the updated input feature set for the AI model, multiple paths of nodes may be evaluated together for the strength of their connections, which may give a probability of the nodes being common or being predictive of the same behavior. The strengths of the connections may be provided by the optimization technique used (e.g. ant colony optimization), which may imply inferred edges of a given weight. The inferred edges may be discovered through optimization, and may be of short distances, implying a strong connection between nodes that may have otherwise have been seen as disconnected and/or distant from one another. Once the commonality between sets of nodes has been discovered, it may be determined that they make up paths representing common information, and may thus be combined into a single feature.

A. Signal to Noise

In one embodiment, paths detected through optimization may be evaluated for similar signal-to-noise. Evaluating the detected paths based on a signal-to-noise criteria may provide a flattened graph structure or set of compact rules that may allow an AI model to learn and predict outcomes more quickly and more accurately. For example, when evaluating a path of nodes for a signal that is highly indicative of a young consumer that may act according to specific trends, one may determine a path corresponding to consumers located in San Francisco may be similar in signal-to-noise to a path corresponding to consumers located in New York, despite being linked to different merchants or to different input nodes. The nodes that make up the two distinct paths may be combined as one feature that may be provided in an updated feature set or new set of training data to an AI model. The AI model may then learn from the feature set and may then use the new knowledge to place consumers into communities and make appropriate recommendations to consumers in both cities.

B. Clustering

According to other embodiments, paths detected through optimization may be clustered together to form a reduced feature set. In one embodiment, paths may be clustered together if they are oriented close to one another in the graph topology. Any given node may belong to multiple clusters and clusters may overlap one another. For example, an AI that is trained to generate merchant recommendations for consumers may be fed an updated feature set in which some merchants are of multiple clusters and thus defined by more than one feature. In other words, clustering may be used to combine features that contain related information and may be used to make the same prediction. In another example, an AI model for identifying songs may base a prediction based on learned beat patterns associated with each genre. Rather than treat every single variation of a hip-hop beat as a single feature that must be scored, separate features representing similar beats patterns may be clustered together and scored after each prediction.

C. Other Techniques

A number of other methods or techniques may be utilized for smoothing out the information space. This may be done using any ensemble or non-parametric learning methods such as neural network, decision tree, random forest, gradient boosted tree, added boosted, tree net, etc. In one embodiment, the sets of nodes may be split into their principal components and the features may be linearized based on signal-to-noise. In another embodiment, the paths may be organized into trees and then binned according to a bootstrapping method.

D. Prim's Algorithm

Another example is Prim's algorithm. In one embodiment, Prim's algorithm may be used to include, exclude, and/or combine features in order to make them more predictive. Further details regarding Prim's algorithm that can be incorporated into the method described herein can be found in U.S. patent application Pub. No. US 2006/0143071 A1 to Hofmann. The application is hereby incorporated by reference in its entirety for all purposes.

Prim's may be used to perform final combining of features discovered through ant colony optimization or through a similar optimization technique. Once features have been detected through optimization, binning or smoothing may be performed on the features in order to reduce the number of variables that make up the feature set. This may be done by identifying that specific variables or input nodes may be lumped together and treated as a single variable or node. In other words, the cardinality of each feature, that is, the number of elements or nodes in the set of nodes within an identified path, may be reduced. This may aid in allowing an AI model to learn and make stronger predictions from the information space, by making the information space less complex through the reduction of variables, thereby simplifying the problem that the AI is trying to solve. In other words, binning or smoothing of the detected features may provide an updated feature list which may comprise of a sparse matrix in which the degrees of freedom have been significantly reduced, thereby making the AI model more robust.

In one embodiment, Prim's may be used to determine the features that can be included or excluded from the updated feature list. Once features have been detected through optimization, the features may be passed into Prim's algorithm, which may correlate the different features in order to reduce the cardinality of the information space based off of a signal-to-noise criteria. In essence, the detected features may be broken down such that a set of many nodes and connected edges may be transformed into a single feature. This can be seen as analogous to breaking down the information space into a linear equation of principal components and mathematically transforming in order to map the components to their corresponding outcome (e.g. support vector machines).

In one example, Prim's algorithm may be used to better understand characteristics of merchants that are associated with fraud, and thus may allow an AI to perform better risk modeling. Multiple merchants may be evaluated for their level of riskiness, and various characteristics that the merchants share may be combined into a single feature that may provide some indication of fraud. Using Prim's, the feature files of the merchants may be combined and fed into the AI so that the AI may learn and test the effectiveness of identifying the fraud based on the combined feature. This may allow the AI model to adapt to concept drifts that may cause previously determined predictive variables to no longer be predictive of the target variable due to changes in the information space. For example, a criminal may determine a way to bypass a previously secure merchant's system or the criminal may begin infiltrating a different type of merchant upon failing at the first type of merchant. For these types of scenarios, Prim's algorithm may be able to combine features shared between merchants that are infiltrated by the criminal in order to identify a series of behavior that may be used to predict when the criminal may attempt to infiltrate another merchant that was not previously linked to fraud.

In addition, Prim's may allow for the trimming of the information so that an AI may be able to parallel process or learn from the training data at a much faster pace. Binning may allow for the transformation of the predictive variables into a sparse matrix in which the various features are broken up according to their signal-to-noise ratio in relation to their targeted outcomes. Continuing from the above example, merchants of a particular merchant category code or MCC may have a relative strong level of fraudulent transactions (signal) to non-fraudulent transaction (noise). There may be multiple MCC values that are all highly indicative of fraud, and the input nodes of those MCC values may be grouped together to form a single feature from which the AI model can learn and make accurate predictions from. Thus, the AI may have fewer degrees of freedom for identifying fraud, and may quickly flag any merchant that shares the single feature that is inferred to be linked to a high probability of fraud, which may encompass multiple MCC values. The same process could be performed for other forms of risk indexing, such as indexing various transaction amounts or other types of transaction data to specific levels of fraud based on signal-to-noise.

VII. USING SELECTED FEATURE SET TO TRAIN MODEL

Once the features have been binned and the inferred data has been properly smoothed, the updated feature set may be used to retrain the AI model. The AI model may be re-trained periodically; however, training may now be performed using the updated feature set. Once the old feature set has been replaced by the updated feature set, the training data may be refreshed, and the AI model may continue learning; this time with new features that better reflect the current state of the information space from which the AI is predicting outcomes for.

The updated feature list set may comprise a list of input nodes, and/or may comprise a collection of input nodes as paths or clusters that may be expressed as a string of aggregated input nodes. The input nodes may be individual information elements that can be contained in a request such as a type of transaction (e.g. cardholder not present). The features may be used by the AI model to make predictions, in which a given entity or request may be linked to one or more feature in the feature set. For example, a financial transaction may be conducted at a specific terminal, which may be expressed in the graph as an input node having the individual characteristics of 'location=94113,' 'Merchant=merchant X,' 'transaction type=cardholder not present,' 'terminal ID=12535.' The characteristics may be concatenated together and used to define or label the node, as well as determine its position in the graph. An AI model may be using the graph of the information space comprising the input node of the terminal to detect instances of fraud. The updated feature list may comprise of one or more features that may be connected or linked to the input node of the terminal (e.g. 'cardholder not present', '94113MerchantX,' etc.), which may allow the AI model, based on its training, to predict if the terminal for the financial transaction is highly correlated to fraud or not.

In one embodiment, common sense rules may be applied to a proposed set of features such that characteristics known to be opposed to one another may not be of the same feature. For example, a rule may be applied for a proposed feature list in which input nodes for 'cardholder present' and 'cardholder not present' cannot be combined. Any number of predetermine rules may be set, such that a proposed feature set may be better tuned for a particular problem before being input into a particular AI model.

A. Index Tables

The variables corresponding to selected features in an updated feature list may be organized into index tables, in which one or more features are linked or indexed to their corresponding predicted outcome. This may provide a flattened graph that allows the AI to perform simple key value look-ups when learning and predicting outcomes. In one embodiment, one or more index tables may be generated or compiled from graph databases, which may be processed such that self-contained clusters defining a particular part of a graph may be mapped using pairwise comparisons. The graphs may be connected or disconnected, and each key value in the index table may correspond to a given node or feature based on position, signal-to-noise, or average rate or amount depending on the particular application.

Key value lookups may be performed in a pairwise manner, in which key values may be queried to determine a corresponding predicted outcome. A feature comprising a plurality of input nodes such as characteristic 'A,' 'B,' and 'C,' and may be expressed in an index table in which 'ABC' may be queried and retrieved. Thus, the subset of the graph comprising input nodes 'A,' 'B' and 'C' may be expressed together as a feature in a flat list. In one embodiment, an individual node may be included in more than one feature, cluster, and/or index table. For example, a 'cardholder not present,' node may be included at the beginning of many features along with varying values of different characteristic or varying input nodes such as 'issuer region,' acquirer region,' bin amount,' time of day,' which may each result in different outcomes.

B. Graph Queries

Figure 7:
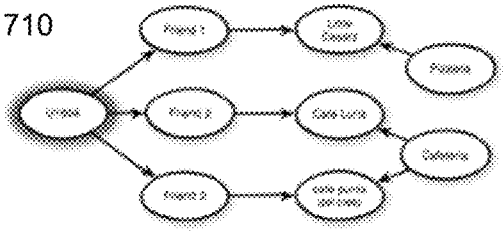
FIG. 7 shows a depiction of commands made in a graph query according to embodiments of the invention.
Figure 7:
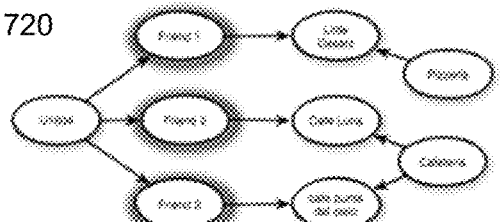
Figure 7:
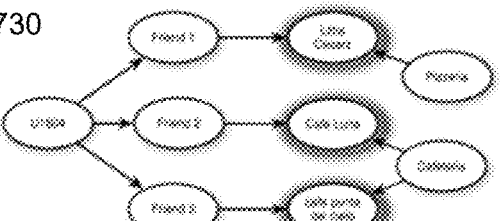
Figure 7:
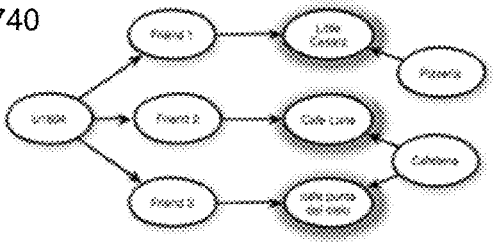

FIG. 7 shows a depiction of commands made in a graph query according to embodiments of the invention. Graph queries may be used to extract information about the information space and the connections within it. For example, for a given input node representing a user device, a graph query may be used to identify an output node that is strongly related to the device (e.g. a recommendation) via edges. This may include inferred edges generated during the detection and binning of new features. Table 700 shows a list of commands that can be initiated in order to search through a connected graph.

Command 710 shows a first command in which a specific vertex or input node with a given property has been selected. In this example, a command "g.V.has('userID', 'U1064') may be initiated to communicate that the node corresponding to a user ID value of 'U1064' has been selected from the graph. The selection of the input node may be used to identify its position in the graph in order to determine an accurate prediction (i.e. strongly correlated output node).

Command 720 shows a second command in which the nodes adjacent to the selected node may be read or moved to along its connecting edges. In this example, users similar to user, 'U1064,' identified as 'friends' (i.e. 'Friend 1', 'Friend 2', 'Friend 3') are queried using a command "out ('friend')". This moves the query from 'U1604,' to nearby 'friend' nodes along the corresponding 'friend' edges. The 'friends' may be users that may be identified by one or more of the same features that identify user 'U1604.' For example, the 'friends' may be input nodes that share the feature of: 'Location=San Francisco,' age=25 years old,' Time of day: afternoon,' with user 'U1604.'

Command 730 shows a command in which nodes adjacent to the nodes adjacent to the originally selected node are then queried or moved out to. In this example, the query moves from the nodes connected to 'U1604' by 'friend' edges to adjacent nodes along 'visit' edges, which may be restaurants that 'friends' of 'U1604' have visited or a recommendation for a restaurant that the 'friends' have acted upon. For example, the 'friends' may have accepted recommendations to order food at 'Little Cesarz,' 'Café Luna,' and 'café punta del cielo.'

Command 740 shows a command in which the currently selected nodes are remembered. In this example, an "as('x')

command may cause the recordation or storage of the values for restaurants visited by users similar to user 'U1604' as 'x.' The remembered values may then be used to output a requested prediction. For example, the remembered values may be sent to a user device as a list of recommendations.

C. Ranking/Scoring

According to embodiments, the AI model may begin training and using the candidate input features generated through optimization and binning, and may provide a ranking of the candidate input features relative to a measure of effect on an output value. In one embodiment, the number of features included in the list of features may be capped, wherein only the highest predetermined number rank of features may be included in the updated feature list. Instead of continuously adding features, only the features that are most predictive may be included in the updated feature list, such that the number of total features may not become too large, thereby resulting in too much data that has to be processed. For example, a set of 250 candidate features for an AI model in which it is specified that only 200 candidate features may be included in the updated feature list. The enlarged feature list with all 250 candidate features may be input into the model, and may be ranked based on their predictiveness or effect on achieving a desired outcome. Then, based on the ranking, the highest 200 features may be included in the updated feature list, while the remaining 50 may be left out. In one embodiment, an alert may be initiated when, after running the autonomous learning algorithm, the features in the list of highest ranked features have not changed.

VIII. APPLICABLE ARTIFICIAL INTELLIGENCE MODELS

Example applications for an autonomous learning AI are provided below.

A. Recommendations

Figure 8:
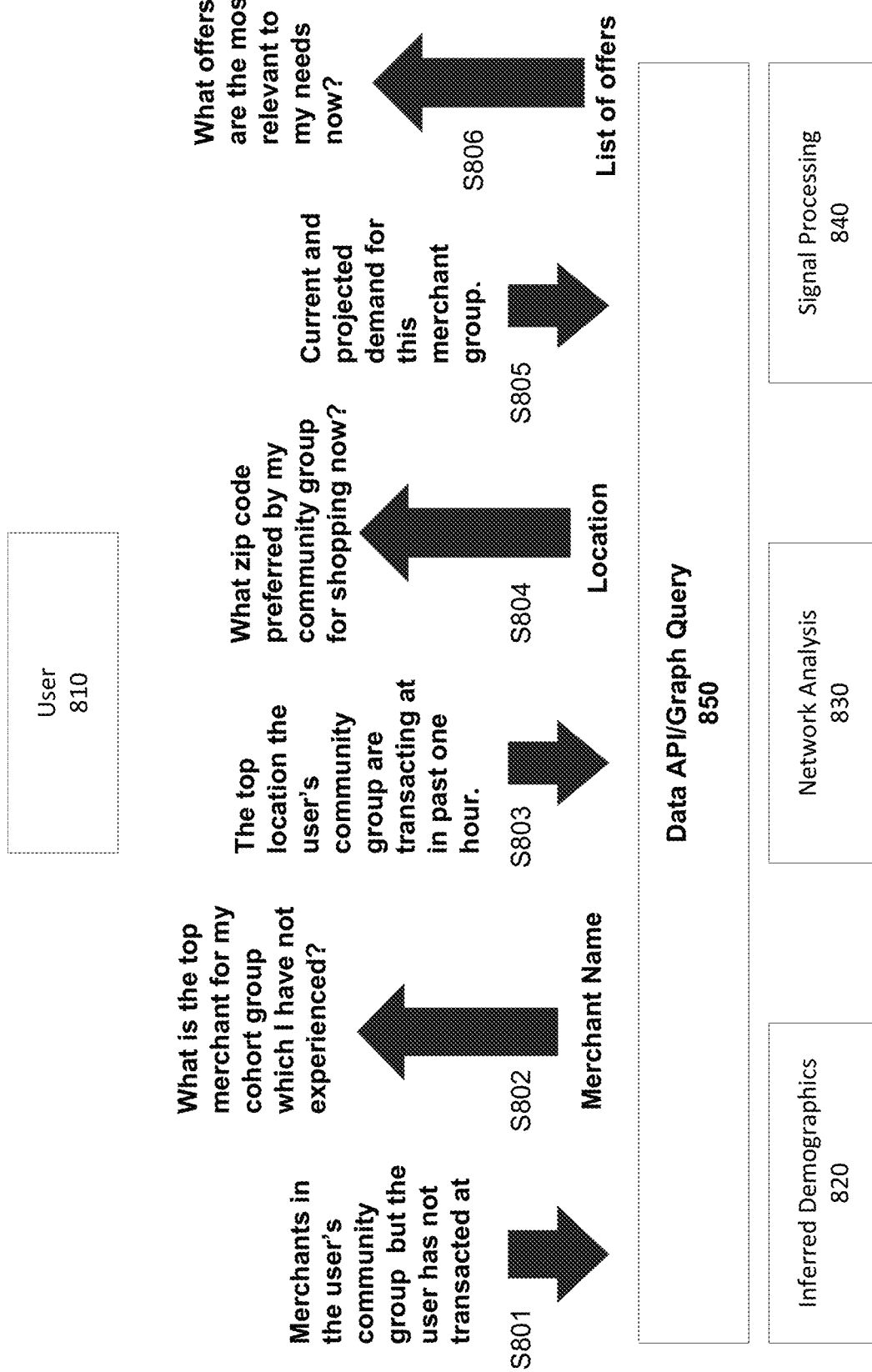
FIG. 8 shows an example of an application of an artificial intelligence model according to an embodiment of the invention.

FIG. 8 shows an example of an application of an artificial intelligence model according to an embodiment of the invention. Specifically, FIG. 8 shows an example of how the autonomous learning algorithm may be applied to an AI model for generating recommendations for users. A user 810 may be looking to receive recommendations for merchants that may provide a good or service that they are interested in, such as a trendy restaurant or other establishment that caters to other consumers similar to user 810.

According to the embodiment of the invention, an information space of transaction behavior consisting of users such as merchants and consumers may be expressed as one or more graphs in a graph database. For example, the information space may be expressed in a graph comprising of inferred demographics 820, in which features of a user are determined by inferred edges connecting input nodes to a corresponding output node for demographic information such as gender (i.e. male vs female preferred merchant). The information space may also be expressed in graphs corresponding to network analysis 830 or signal processing 840, which may group users in a graph according to their transactions in a network such as a transactional network or according to similarities based on strength of signal corresponding to identified behavior.

In one embodiment, the graph database may be recorded to and called by Data API/Graph Query 850. A user's position in a graph may be determined by its characteristics and connection to other users such as through transactions conducted between two users (e.g. between consumer and merchant) or by any other information relating to a user profile. Connections between users may be expressed as factual edges representing actual characteristics such as location, time, merchant category code, etc. or by inferred edges, which may connect users according to one or more detected features found using the autonomous learning algorithm described herein. In one embodiment, user nodes positioned close to one another in the graph or connected by strong edges may be clustered (e.g. through k-means clustering) into overlapping groups of nodes known as community groups.

Looking at FIG. 8, arrows pointing downward may represent steps in which information is being recorded into a graph of the information space, while arrows pointing upwards may represent steps in which information in a graph is being queried or requested.

In step S801, data regarding merchants that are in user 810's community group but have not transacted with user 810 may be recorded and expressed in a graph of the information space of transactional behavior. For example, user 810 may be included in a community group corresponding to consumers in San Francisco between the ages of 21 and 28, and the merchants at which those consumers shop on a given day may be recorded. Input nodes and edges may be generated in a graph based on transaction data so that features of the graph may be used as training data for the AI model.

In step S802, user 810 may request a recommendation for a top merchant in which they have not transacted with. The request may comprise information of the user represented by input nodes, and a prediction may be made by the AI model based on the top ranked features comprising the input nodes. The top ranked features may have been scored based on the accuracy of previous predictions (recommendations) made for previous requests, and the corresponding inferred edges may be used to predict a suitable recommendation for current request. In this example, the user may be seeking a recommendation for a new restaurant that that they have yet to try, and the graph query may return a list of restaurants that are popular with consumers in San Francisco between the ages of 21 and 28.

In step S803 a top location in which other users belonging to user 810's community group have been transaction at in the past hour may be determined and recorded. The top location may be determined based on, for example, the number of transactions and/or dollar amount of transactions conducted by consumers in user 810's community group in the past hour at nodes corresponding to specific location characteristics of merchants that those users have transacted at.

In step S804, user 810 may request a recommendation for a preferred zip code in which users in user 810's community group is currently shopping at. The preferred zip code may be determined based on one or more features comprising input nodes of user 810's community group and of nodes corresponding to location characteristics of merchants that those users have transacted at within a given period of time such as within the past hour (i.e. according to the top location determined in S803). In this example, the graph query may return a list of merchant nodes related to a trending event located in a specific part of a city which may be connected to other nodes that share one or more features with user 810.

In step S805, a current and projected demand for a specific merchant community group may be determined and recorded. The demand may be determined based on the connectivity between nodes included in the specific merchant's community group such as based on the number of transactions or cumulative dollar amount of purchases. For example, a demand for dive bars in the Mission District of San Francisco may be determined based on edges corresponding to connections that may represent transactions recently conducted at other dive bars that share the same features and appeal to the same customer base.

In step S806, a request for offers that are most relevant to user 810's needs may be generated and the corresponding requested data may be retrieved by user 810 based on the predicted demands of the user as determined by one or more features. For example, it may be determined that the users sharing the feature of 21-28 year old consumer in San Francisco are currently strongly connected to nodes for dive bars and may be respond to user 810's request by presenting user 810 with offers regarding drink specials at dive bars in the Mission District of San Francisco.

B. Chat Bots

In one embodiment of the invention, an updated feature list may be used to determine appropriate responses for a chat bot in order to steer a consumer towards making a purchase. Each user conducting a conversation with a chat bot may be a user associated with a profile comprising information about the user such as preferences or transaction history. The user profile information may be expressed in a graph as input nodes connected to an input node identifying the user via edges. Furthermore, similar users may share one or more features, which may comprise of inferred edges connecting one or more users that share similar characteristics and may further be connected to output nodes for specific products that the users may be prone to buying.

In one embodiment, the chat bot may also be looking at the context of messages or requests being sent. For example, regarding a given chat message submitted by a user, the AI model used to determine appropriate responses for the chat bot may be looking at the relevance of the message to past purchases of the user, past purchases of other users related to the user, or topics or products being discussed by other users in other chat bot conversations. This may allow the chat bot to determine a response that may recommend or initiate a purchase which is relevant to the user and other users that share the same features at any given moment in time based on current trends and conversations.

C. Cyber Security

In another embodiment, an updated feature list may be used by an AI used to detect breaches inside of a system. A company may have a set of login criteria and methods to access various pieces of data stored or processed in their system, such as data for particular users, and the AI may be able to learn to identify instances in which a breach has occurred based on one or more detected features. Furthermore, the AI may be able to request different forms of authentication based on a predicted riskiness as determined by one or more features. For example, a bank that allows a customer to access his or her account using a mobile banking app may require different forms or number of layers of authentication (e.g. biometric login, manual password entry, pin, confirmation text, etc.) based on characteristics of logins and its relation to known patterns (features) correlating to a breach such as a frequency of attempted logins, time of day, location of login device, etc. The AI may base its decision on a graph representing attempted logins and their corresponding characteristics as input nodes, which may be grouped as features in which input nodes are linked to output nodes corresponding to different likelihoods of a breach. This may allow the bank to provide quick and easy logins while also maintaining a high level of security, as login attempts that are linked to high risk features may require stricter login procedures than login attempts that are linked to low risk features.

IX. FURTHER DETAILS

A. Parallel Processing

In one embodiment of the invention, the method of performing autonomous learning may be implemented on parallel processors and/or graphics processing units or GPUs. Parallelization may be used in order to spread processing across multiple units in order to achieve a collective hive or swarm intelligence for performing autonomous learning. For example, when performing ant colony optimization, the agents may be distributed amongst a plurality of GPUs so that the agents may simultaneously solve for a solution in real-time and in parallel in order to more quickly reach an optimal solution. In addition, the distribution of processing amongst GPUs may allow for better handling of floating point numbers as well as vectors, thereby providing greater performance for highly dynamic systems.

Figure 9:
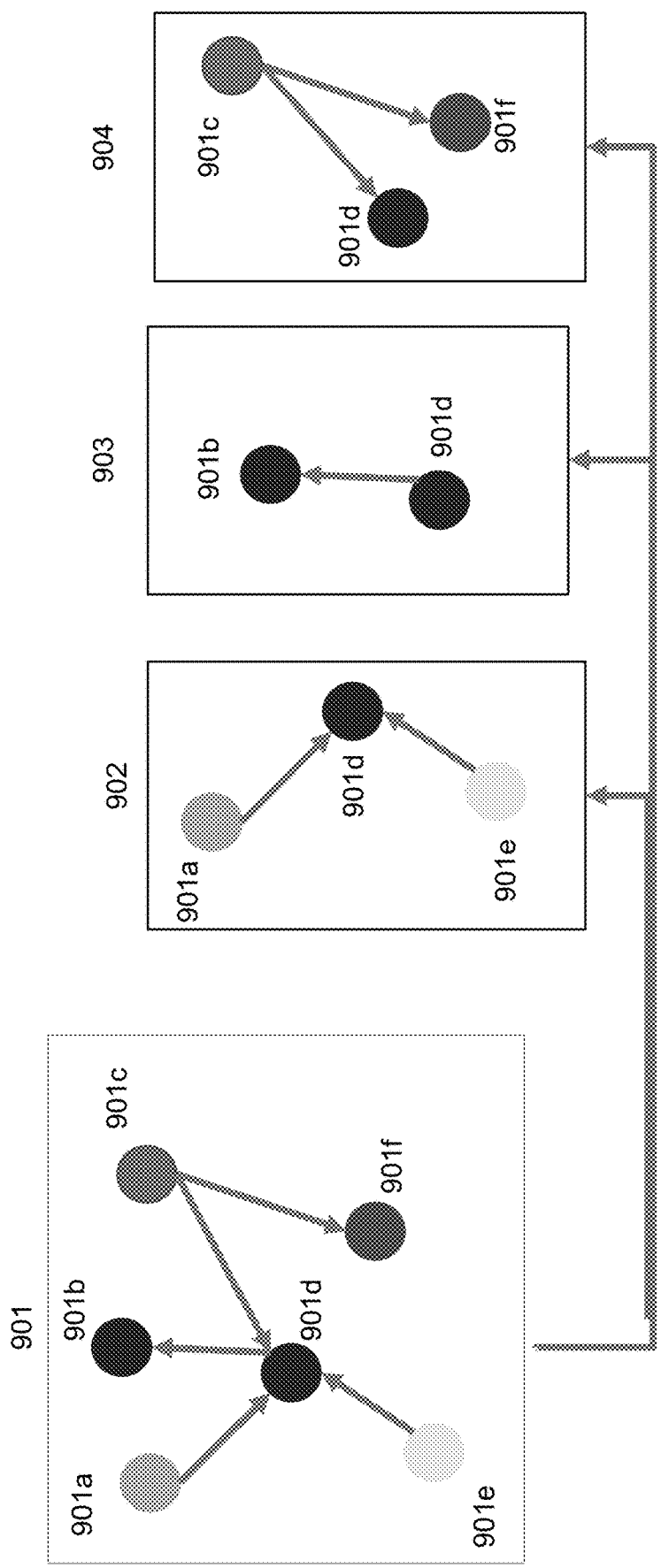
FIG. 9 shows an illustration of graph sharding according to an embodiment of the invention.

FIG. 9 shows an illustration of graph sharding according to an embodiment of the invention. Graph sharding may refer to the splitting up of a graph into multiple overlapping subgraphs. A graph may be sharded in order to split the processing of the information space in a distributed framework. This may be similar to performing a random forest or random decision forest method on a graph, in which the overall graph is split into multiple subsets or classifications. The classifications may be determined based on a type of similarity between nodes, and the classifications may overlap as any given individual node may have at least some level of similarity to more than other node of different classifications. For example, a node corresponding to a merchant in San Francisco may be classified with other merchants in San Francisco; however, the node may also be classified with other similar merchants in Los Angeles that have similar characteristics or may be associated with the same feature (e.g. dive bar, taco stand, thrift store, etc.). Thus, the node may be included in multiple subgraphs which may each be processed by an individual GPU in a distributed framework.

Looking at FIG. 9, a connected and directed graph 901 may comprise a plurality of nodes 901a, 901b, 901c, 901d, 901e, and 901f. The graph may be sharded into multiple overlapping subsets based on their relative distance to one another. Subset 902 may comprise nodes 901a, 901d, and 901e. Subset 903 may comprise node 901b and 901d. Subset 904 may comprise node 901c, 901f, 901f. Each of these subsets may be treated as individual graphs by a given processing unit in a distributed parallel processing framework, such as in the case of distributed GPUs, wherein each processing unit or processing core may act as an agent performing optimization (e.g. performing ant colony optimization to detect new features). According to embodiments of the invention, a graph may be sharded based on an individual problem being solved and may be done such that the system is biased towards a given solution that best fits the individual problem. For example, a graph for an AI model that is learning to provide recommendations to consumers may be sharded according to different rules than a graph for an AI model that is learning to detect fraud or security breaches in a system.

Figure 10:
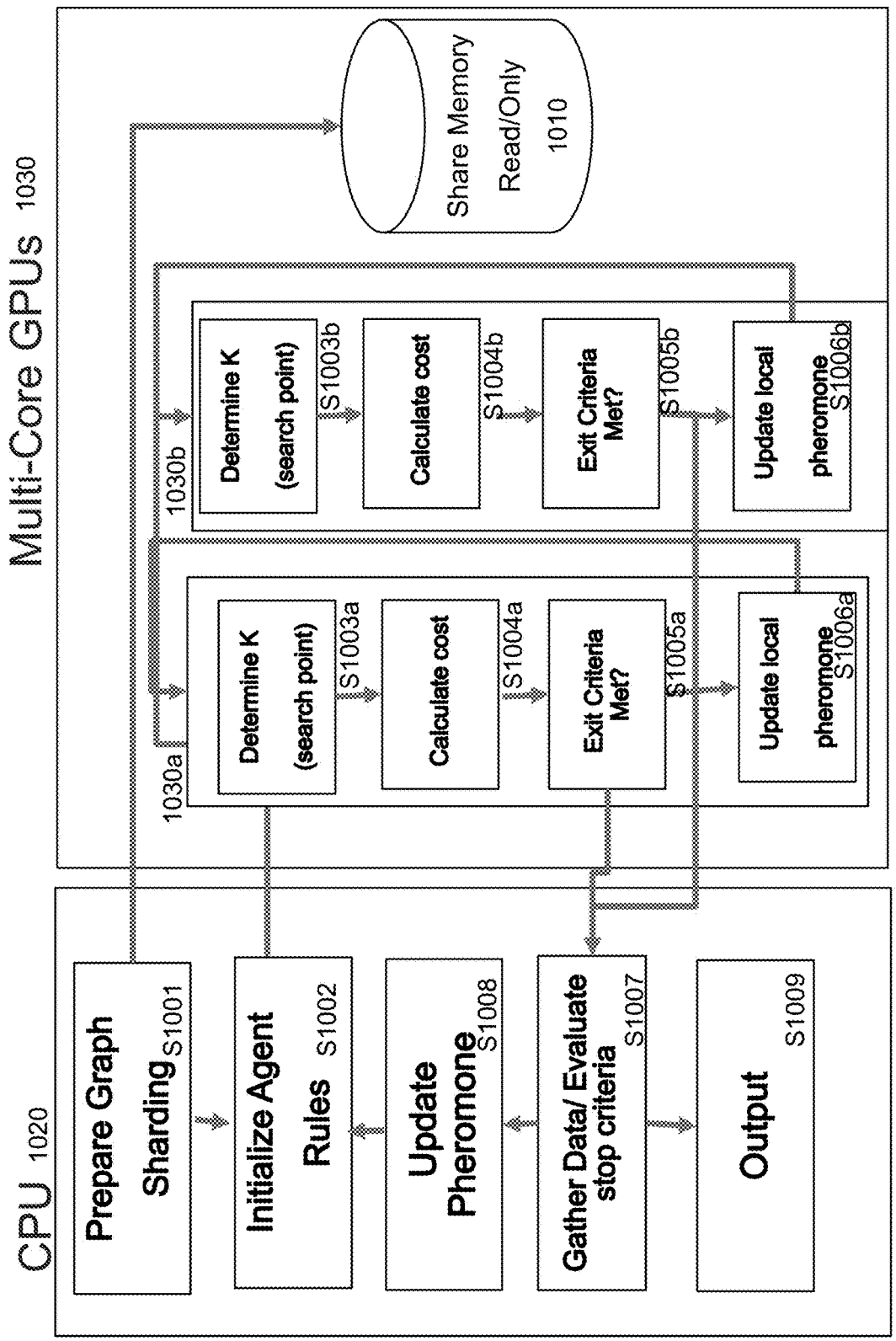
FIG. 10 shows a diagram depicting a process for autonomously detecting new features that is implemented in a distributed framework, according to embodiments of the invention.

FIG. 10 shows a diagram depicting a process for autonomously detecting new features that is implemented in a distributed framework. The distributed framework may comprise of a memory 1010, a central processing unit or CPU 1020, and a multi-core GPU 1030 comprising one or more processing cores such as core 1030*a* and core 1030*b*. The process that is implemented may be a derivation of an optimization technique that utilizes multiple agents to find good paths in a graph, such as ant colony optimization.

Looking at FIG. 10, in step S1001, a graph of the information space from which an AI model is learning from may be prepared and sharded into subgraphs of similar nodes. For example, a graph may comprise of nodes corresponding to consumers, merchants, and their associated characteristics and may be sharded into overlapping subgraphs from which new features can be determined. The graph may be read from memory 1010, and the subgraphs that result from sharding may be recorded and shared in memory 1010 as well. The subgraphs may be accessed from a plurality of agents that may each search for a solution for a particular subgraph and record their results.

At step S1002, agent rules may be initialized for each of the agents that are searching for a solution. The agent rules may include a definition of a target goal, an expression for how cost and/or error of a proposed solution is calculated, recorded and evaluated, as well as rules for other search criteria such as duration of each search cycle and distribution of the agents. Once the agent rules have been initialized, the agents at each processing core of multi-core GPU 1030 may begin searching for a solution.

At step S1003*a* and S1003*b*, each of the agents may determine a proposed solution which may be a search point or movement factor K that identifies a particular force or movement vector pointing towards a direction of new information. The presence of new information may be based on the detection of a strong signal regarding the target goal (e.g. strong indication of fraud).

At step S1004*a* and S1004*b*, each of the agents may calculate a cost for its proposed solution. The cost may be calculated according to agent rules that may have been defined at initialization such as based on total distance between nodes or based on signal-to-noise criteria. At step S1005*a* and S1005*b*, each of the agents may determine if exit criteria has been met. The exit criteria may include a predetermined cost criteria or cost requirement, in which a particular processing component or core of multi-core GPU will continue to search for a solution until the calculated cost of its proposed solution meets the predetermined criteria. If for a given iteration, the proposed solution does not meet its exit criteria, step S1006*a* and/or S1006*b* may be initiated.

At step S1006*a* and S1006*b*, the current solution state may be recorded so as to bias the agent towards a given solution before it performs another solution search at steps S1003*a* and S1003*b* respectively. The agents may continue to search for a solution until the solution that has been proposed meets the exit criteria (i.e. cost criteria). If it has been determined at S1005*a* and S1005*b* that the exit criteria has been met, step S1007 may be initiated. At step S1007, the data regarding the proposed solutions found by each of the agents may be gathered and evaluated to see if the stop criteria has been met. The stop criteria may include criteria relating to the error of the aggregate solution proposed by the colony of agents in relation to the target goal. If the stop criteria has not been met, then the current aggregate solution may be recorded. The current aggregate solution may be recorded in the form of an updated global pheromone, in which the agents may be initialized in a biased or weighted manner so that they may more quickly converge towards the global solution in a subsequent epoch of the global solution search. The agent rules may again be initialized at step S1002, and the agents may continuously be distributed and initialized for solution search until an aggregate solution that meets the stop criteria has been met. In other words, the agents may be continuously cycled until it has been determined that the target goal has been met within a predefined margin of error.

If at step S1007 it has been determined that the stop criteria has been met and/or the target goal has been achieved, step S1009 may be initiated. At step S1009, the final solution as determined by the colony of agents may be output by the CPU, which may comprise a set of features. The new features may be expressed as sets of paths or movement vectors between nodes, wherein the set of input nodes within a path are collectively determined to be highly predictive.

B. Example method for performing autonomous learning

Figure 11:
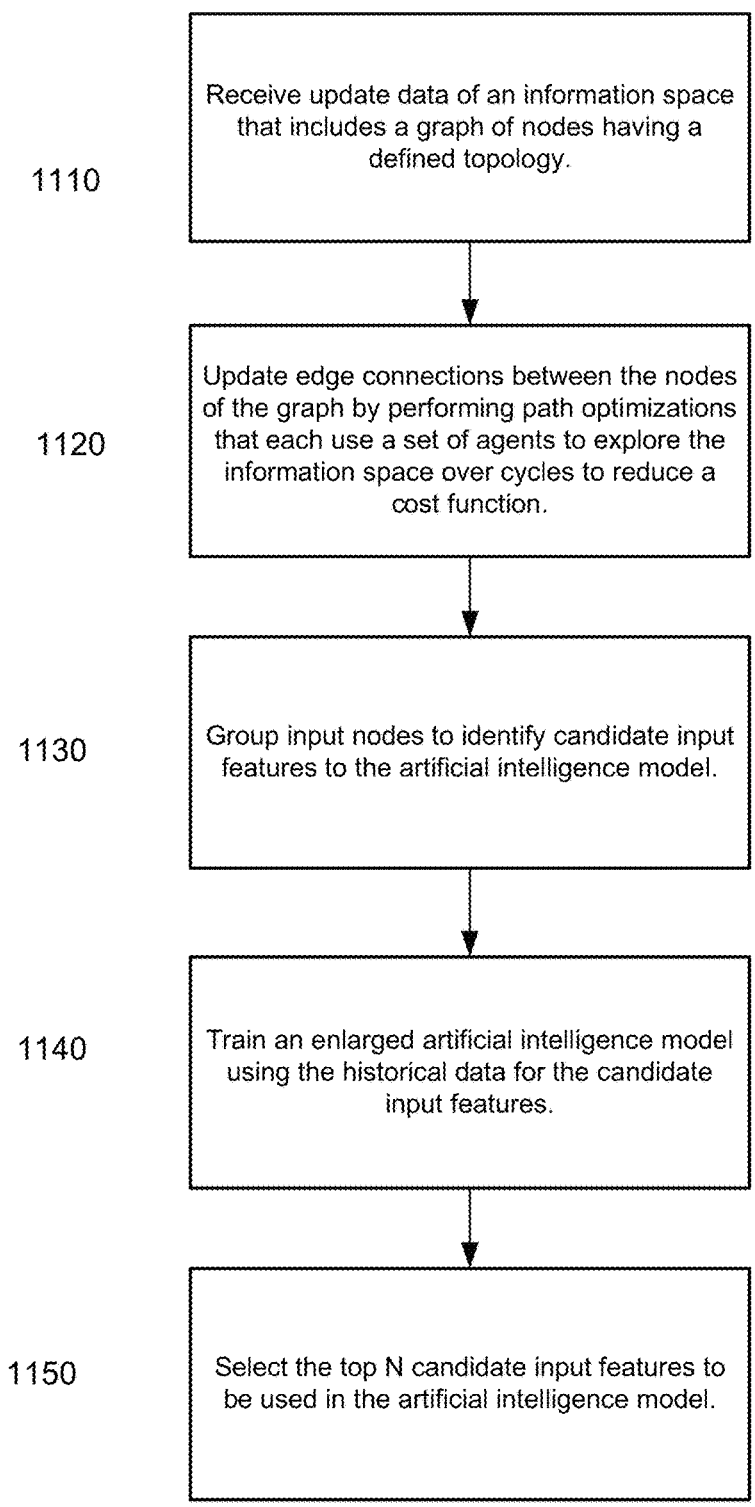
FIG. 11 a flowchart of a method of performing autonomous learning for updating input features used for an artificial intelligence model.

FIG. 11 shows a flowchart of a method of performing autonomous learning for updating input features used for an artificial intelligence model. The method comprises steps 1110 through 1150.

Step 1110 comprises receiving updated data of an information space that includes a graph of nodes having a defined topology, e.g., as described in section III. The updated data may include historical data of requests to the artificial intelligence model and output results associated with the requests, wherein different categories of input data corresponds to different input nodes of the graph. The output results can include a measure of whether the output results were successful, e.g., that a use followed a recommendation, provided feedback that a particular response was helpful, whose chat response indicated the response was suitable, etc. In an example for an AI model for routing messages in a communication network, the historical data of requests may comprise data for requests to predict the most efficient routing schemes to send messages between a set of input nodes and output nodes, and the output results may comprise the routing scheme chosen for each prediction, the transmission time of each message that was sent, and indications of if the messages were successfully transmitted.

Step 1120 comprises updating edge connections between the nodes of the graph by performing path optimizations that each use a set of agents to explore the information space. The set of agents may search the graph over cycles for a set of paths that reduce a cost function. Each connection may include a strength value, and during each path optimization, path information may be shared between the rest of agents at each cycle to determine a next position value for each of the set of agents in the graph. Examples of such agents are provided in section IV.

The path information from a previous iteration may affect the search performed by each of the agents at a next iteration, such that low cost paths have a higher probability of being searched than high cost paths. For example, the agents may search the graph for a set of routing schemes that result in an average transmission time of 75 milliseconds or less (cost). A set of computational agents may perform a search of historical data relating to each routing path, wherein each computational agent may search a different portion of the graph. The transmission time (strength) of each found path may be recorded, and paths that lower the average transmission time of the network may be encouraged during each successive cycle until the average transmission time requirement has been met.

The proposed set of paths during a cycle (i.e. the solution state of the cycle) may be evaluated relative to a target goal until the error of the solution state yields a sufficient result. The error structure may be recorded as a gradient of the graph, and may affect the initialization of the agents at the start of each iteration, such that the agents are initialized according to a weighted distribution that is biased towards regions of lower error. This may allow the agents to converge to a globally optimal solution state. For example, a set of routes that have a fast transmission time may be proposed during a cycle, and the overall transmission failure rate (error) of the proposed paths may be recorded. The agents may be initialized to perform an additional search, and may be distributed such that the agents are biased towards a set of routing schemes (global optimum) that yields a 0.01% transmission failure rate (goal).

Step 1130 comprises grouping input nodes to identify candidate input features to the artificial intelligence model. The input node(s) of a candidate input feature may be correlated to each other, and the candidate input features may have strength values above a threshold. For example, a group of input nodes connected by edges in a graph may represent nodes (i.e. connection points) in a communication network, where the weights represent the transmission time between nodes. The nodes may be highly connected (e.g. have a transmission time between them that is 10 milliseconds or less) and may be grouped as a feature that may be used during training.

In another example, referring back to FIG. 3, input nodes Y, X, and W which correspond to characteristics 'Male', 'San Francisco', 'Shops at Music Store' respectively may be connected by high strength connections as taken by the inverse of their edge weights (i.e. ¼, ½). The threshold for grouping input nodes as a candidate input features may be any connection strength ¼ or higher, and nodes Y, X, and W may be grouped together to form 'First Feature 301.'

Detected features may be combined into a single feature if they contain input nodes that are similar or communicate similar information. This may be done to bin feature data so that the updated feature list may be reduced, thereby resulting in a more robust model. For example, two separate routes (features) for connecting point A and point B in a communications network may both meet a transmission time requirement and may have similar transmission failure rates (e.g. the routes may differ by a single node, and the two differing nodes may also be highly connected to one another). The historical data for the two routes may be binned together into a single feature, such that the learning algorithm may train using less data (e.g. the two routes may be treated as the same prediction when either is chosen and may also be scored together).

Step 1140 comprises training an enlarged artificial intelligence model using the historical data for the candidate input features. For example, a learning algorithm may be used train an AI model for predicting optimal routing schemes in a communication network, in which routes (features) connected to a node where a message originates may be used to predict an optimal route to its end location. During training, the learning algorithm may score each feature based on its accuracy (e.g. tracking if a route or feature led to the successful transmission of a message or scoring routes that lead to faster transmission times higher than routes that lead to slower transmission times).

Step 1150 comprises selecting the top N candidate input features to be used in the artificial intelligence model. The quantity, N, may be a predetermined number specific to a particular problem. For example, it may be determined that only 300 routes are needed to sufficiently connect all nodes in a network, and only the top 300 fastest routes may be used as options for the AI model when predicting the optimal path to send a message from point A to point B.

C. Improvements Over Prior Techniques

Various embodiments can provide a number of technical advantages over prior art. Embodiments of the invention allow for autonomous learning in a dynamic environment through the detection of new features. Prior methods for configuring an artificial intelligence model for a dynamically changing environment required manually re-building the AI model on the fly. In other words, prior methods required those skilled in the art to constantly redefine new rules for the AI model when features used for predictions no longer became predictive. This could prove to be very time-consuming as any given information space may continuously be changing.

In addition, such an approach may still fail to make accurate predictions in cases of subtle or incomplete concept drifts, or in cases in which a drift in an explanatory variable has not been transformed in the AI such as in the case of strong concept drift. Embodiments of the invention can provide a more efficient and accurate method of operating in a dynamic environment by executing an algorithm that may autonomously detect and compile new features that are highly predictive at the environment's current state. Furthermore, other methods of optimizing for new features, such as genetic algorithms, tend to converge to locally optimal solutions rather than global solutions that are of interest, and may also fail to reach the same level of speed and compatibility with parallel processing. Embodiments of the invention can be implemented on multiple distributed GPUs, thereby allowing for greater processing speed that is required for specific use cases such as recommendations, chat bots, or security breaches to be achieved.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention.

However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A method of performing autonomous learning for updating input features used for an artificial intelligence model, the method comprising:
   (a) receiving updated data of an information space that includes a graph of nodes having a defined topology, the updated data including historical data of requests to the artificial intelligence model and output results associated with the requests, wherein different categories of input data correspond to different input nodes of the graph;
   (b) updating, using multiple iterations of a path optimization model until convergence, edge connections between the nodes of the graph by performing a plurality of path optimizations that each use a set of agents to explore the information space over cycles to reduce a cost function, thereby determining optimized paths, each connection including a strength value, wherein during each path optimization of the plurality of path optimizations performed in step (b), path information is shared between a rest of the agents at each cycle for determining a next position value for each of the set of agents in the graph;
   (c) after using the path optimization model to determine the optimized paths in step (b), grouping input nodes of the optimized paths according to correlations to identify new features to the artificial intelligence model, and combining the new features with previous input features to form candidate input features, wherein the candidate input features have strength values above a threshold;
   (d) training the artificial intelligence model using the historical data for the candidate input features, the training providing a ranking of candidate input features relative to a measure of effect on an output value of the artificial intelligence model; and
   (e) selecting a plurality of top candidate input features to be used in the artificial intelligence model.

2. The method of claim 1, wherein step c) further comprises combining two or more candidate input features into a single feature when the two or more candidate input features share a predetermined number of input nodes.

3. The method of claim 1, wherein sharing path information between the rest of the agents during each cycle comprises:
   adjusting parameters affecting a probability of each path being searched in a subsequent cycle, and
   wherein determining a next position value for the agents comprises selecting paths during the subsequent cycle based on the adjusted parameters.

4. The method of claim 3, further comprising:
   repeating steps a) through e) at a later point in time, and
   wherein the updated data at the later point in time includes historical data of additional requests to the artificial intelligence model and output results associated with the additional requests.

5. The method of claim 3, wherein the path information includes an error relative to a target goal.

6. The method of claim 5, further comprising performing step b) until the target goal has been met.

7. The method of claim 6, further comprising initializing the agents at a start of each cycle according to a weighted distribution that is based on a gradient of the error relative to the target goal.

8. The method of claim 7, further comprising:
   placing the input features into an index table of key-value pairs linking the input features to their predicted outcomes;
   receiving a request for a prediction comprising one or more input features;
   querying the index table of key-value pair for a predicted outcome linked to the one or more input features; and
   generating a prediction based on the predicted outcome.

9. The method of claim 7, wherein the path information includes movement vectors that point in a direction of new information.

10. The method of claim 7, wherein the set of agents are initialized at the start of each cycle based on specified search criteria, and wherein the specified search criteria include a definition of the target goal, a definition of the cost function, a predetermined cost requirement, and an initial distribution of agents.

11. The method of claim 1, wherein the graph is sharded into overlapping subgraphs that are searched for a solution by the agents in parallel.

12. The method of claim 11, further comprising distributing the subgraphs amongst cores in a multi-core graphic processing unit.

13. A server computer comprising:
a processor;
a network interface; and
a non-transitory computer-readable medium comprising code for instructing the processor to implement a method, the method comprising:
(a) receiving, by the server computer, updated data of an information space that includes a graph of nodes having a defined topology, the updated data including historical data of requests to an artificial intelligence model and output results associated with the requests, wherein different categories of input data correspond to different input nodes of the graph;
(b) updating, using multiple iterations of a path optimization model until convergence, by the server computer, edge connections between the nodes of the graph by performing a plurality of path optimizations that each use a set of agents to explore the information space over cycles to reduce a cost function, thereby determining optimized paths, each connection including a strength value, wherein during each path optimization of the plurality of path optimizations performed in step (b), path information is shared between a rest of the agents at each cycle for determining a next position value for each of the set of agents in the graph;
(c) after using the path optimization model to determine the optimized paths in step (b), grouping, by the server computer, input nodes of the optimized paths according to correlations to identify new features to the artificial intelligence model and combining the new features with previous input features to form candidate input features, wherein the candidate input features have strength values above a threshold;
(d) training, by the server computer, the artificial intelligence model using the historical data for the candidate input features, the training providing a ranking of candidate input features relative to a measure of effect on an output value of the artificial intelligence model; and
(e) selecting, by the server computer, a plurality of the top candidate input features to be used in the artificial intelligence model.

14. The server computer of claim 13, wherein step c) further comprises combining, by the server computer, two or more candidate input features into a single feature when the two or more candidate input features share a predetermined number of input nodes.

15. The server computer of claim 13, wherein sharing path information between the rest of the agents during each cycle comprises:
adjusting parameters affecting a probability of each path being searched in a subsequent cycle, and
wherein determining the next position value for the agents comprises selecting paths during the subsequent cycle based on the adjusted parameters.

16. The server computer of claim 15, wherein the method further comprises:
repeating steps a) through e) at a later point in time, and
wherein the updated data at the later point in time includes historical data of additional requests to the artificial intelligence model and output results associated with the additional requests.

17. The server computer of claim 15, wherein the path information includes a gradient of an error relative to a target goal.

18. The server computer of claim 17, wherein the method further comprises performing step b) until the target goal has been met.

19. The server computer of claim 18, wherein the method further comprises:
initializing, by the server computer, the agents at a start of each cycle according to a weighted distribution that is based on the gradient of the error relative to the target goal.

20. The server computer of claim 19, wherein the method further comprises:
placing, by the server computer, the input features into an index table of key-value pairs linking the input features to their predicted outcomes;
receiving, by the server computer, a request for a prediction comprising one or more input features;
querying, by the server computer, the index table of key-value pair for a predicted outcome linked to the one or more input features; and
generating, by the server computer, a prediction based on the predicted outcome.

* * * * *